(12) United States Patent
Hirabayashi et al.

(10) Patent No.: US 7,885,778 B2
(45) Date of Patent: Feb. 8, 2011

(54) OPTICAL DETECTION DEVICE, ELECTRO-OPTICAL DEVICE, ELECTRONIC APPARATUS, AND OPTICAL DEGRADATION CORRECTION METHOD

(75) Inventors: Yukiya Hirabayashi, Suwa (JP); Takashi Kunimori, Tottori (JP)

(73) Assignee: Sony Corporation, Tokyo (JP)

( * ) Notice: Subject to any disclaimer, the term of this patent is extended or adjusted under 35 U.S.C. 154(b) by 73 days.

(21) Appl. No.: 12/395,772

(22) Filed: Mar. 2, 2009

(65) Prior Publication Data

US 2009/0248344 A1 Oct. 1, 2009

(30) Foreign Application Priority Data

Mar. 31, 2008 (JP) ............................. 2008-089910
Aug. 20, 2008 (JP) ............................. 2008-211462

(51) Int. Cl.
*G01C 25/00* (2006.01)
*G06F 19/00* (2006.01)

(52) U.S. Cl. .................... 702/104; 356/237.5; 356/614; 702/85

(58) Field of Classification Search .................. 702/85, 702/91, 93, 104, 116; 356/237.5, 614, 622; 250/205, 216

See application file for complete search history.

(56) References Cited

U.S. PATENT DOCUMENTS 5,617,203 A * 4/1997 Kobayashi et al. ........ 356/237.5
7,639,374 B2 * 12/2009 Torii et al. .................. 356/614

FOREIGN PATENT DOCUMENTS

| JP | 09-232620 | 9/1997 |
| JP | 2006-029832 | 2/2006 |
| JP | 2006-179478 | 7/2006 |

* cited by examiner

*Primary Examiner*—John H Le
(74) *Attorney, Agent, or Firm*—K&L Gates LLP

(57) ABSTRACT

An optical detection device comprising an optical sensing section that has an optical detection transistor, a threshold voltage detecting section that has a threshold value detection transistor, a sensor output value generating section that generates a sensor output value on the basis of a signal outputted from the optical sensing section, a correction coefficient determining section that determines a correction coefficient that is used for correcting a change in the sensor output value that corresponds to a threshold voltage detected at the threshold voltage section, and a correction processing section that corrects the sensor output value on the basis of the correction coefficient.

22 Claims, 19 Drawing Sheets

OPTICAL DETECTION DEVICE, ELECTRO-OPTICAL DEVICE, ELECTRONIC APPARATUS, AND OPTICAL DEGRADATION CORRECTION METHOD

BACKGROUND

1. Technical Field

The present invention relates to an optical detection device, an electro-optical device, an electronic apparatus, and an optical degradation correction method.

2. Related Art

Generally speaking, the leakage current of a thin film transistor is proportional to the amount of light irradiated thereto. Utilizing such proportionality, an optical detection device of related art detects the amount of irradiating light by accumulating electric charge at a voltage detection capacitor or discharging electric charge that has accumulated thereat by means of the leakage current (optical leakage current) and then by monitoring a voltage change between two terminals of the capacitor. An example of such an optical detection device of related art is described in, for example, JP-A-2006-29832.

The electric characteristics of a thin film transistor degrade optically due to exposure to light. For this reason, the related-art optical detection device described in JP-A-2006-29832 has a disadvantage in that the detection accuracy of the amount of irradiating light lowers as the electric characteristics of a thin film transistor changes due to such optical degradation. In an effort to overcome such a problem, a photoelectric conversion element that has enhanced degradation resistance characteristics, which are obtained by improving the method of forming a thin film transistor, has been proposed. An example of such an improved photoelectric conversion element is described in JP-A-9-232620. As another example of related art that is directed to overcome such a problem, as described in JP-A-2006-179478, a method for correcting a characteristic change due to optical degradation with the use of an analog signal processing circuit that compares the output signal of a photo sensor and a reference signal has been proposed.

However, the photoelectric conversion element described in JP-A-9-232620 has a disadvantage in that it requires special manufacturing conditions, which results in an increase in manufacturing cost. Specifically, when manufacturing photo sensors inside a display device that uses thin film transistors or manufacturing a display device and photo sensors by means of the same manufacturing apparatus, it is not practically possible to manufacture them in the same process as the manufacturing process of the driving transistors of the display device. Accordingly, the photoelectric conversion element described in JP-A-9-232620 requires an additional manufacturing process or the troublesome condition setting of the manufacturing apparatus. The technique described in JP-A-2006-179478 requires an analog signal processing circuit that has a complex circuit structure in order to perform correction processing and a signal source that is used for generating a reference signal, which increases production cost.

SUMMARY

An advantage of some aspects of the invention is to provide an optical detection device, an electro-optical device, an electronic apparatus, and an optical degradation correction method that is capable of improving detection accuracy while reducing cost that is required for implementing and achieving an optical degradation correction function.

In order to address the above-identified problems without any limitation thereto, an optical detection device according to a first aspect of the invention includes: an optical sensing section that has an optical detection transistor and outputs a signal corresponding to the amount of light irradiated to the optical detection transistor; a threshold voltage detecting section that has a threshold value detection transistor that is provided adjacent to the optical detection transistor and is formed in the same process as the formation process of the optical detection transistor, the threshold voltage detecting section detecting the threshold voltage of the threshold value detection transistor; a sensor output value generating section that generates a sensor output value that relates to the amount of irradiating light on the basis of the signal outputted from the optical sensing section; a correction coefficient determining section that determines a correction coefficient that is used for correcting a change in the sensor output value that is caused by the optical degradation of the optical detection transistor and corresponds to the threshold voltage detected at the threshold voltage detecting section on the basis of a relationship between the correction coefficient and the threshold voltage, the relationship between the correction coefficient and the threshold voltage being predetermined on the basis of a correlation between a change in a sensor output value relative to the degree of the optical degradation of the optical detection transistor and a change in the threshold voltage relative to the degree of the optical degradation of the optical detection transistor; and a correction processing section that corrects the sensor output value on the basis of the correction coefficient that has been determined at the correction coefficient determining section. The inventors of the subject application has found that a threshold voltage is an index that indicates the state of the optical degradation of an optical detection transistor (e.g., photo detection transistor) on the basis of a correlation between a change in a sensor output value relative to the degree of the optical degradation of the photo detection transistor and a change in the threshold voltage relative to the degree of the optical degradation of the photo detection transistor. The inventors of the subject application has further found that, if the threshold voltage of the photo detection transistor that is subjected to the irradiation of light is known, it is possible to obtain a constant sensor output value regardless of the progress of the optical degradation thereof by multiplying the sensor output value by a correction coefficient that corresponds to the known threshold voltage. In other words, if the threshold voltage of the photo detection transistor that is subjected to the irradiation of light is known, it is possible to obtain a sensor output value that is equivalent to one that is obtained under a state in which no optical degradation has occurred yet through such multiplication. In order to detect the threshold voltage of the photo detection transistor, a threshold value detection transistor that has the same electrical characteristics as those of the photo detection transistor and is in the same light-exposure state as that of the photo detection transistor is provided. The threshold value detection transistor and the photo detection transistor are arrayed adjacent to each other so as to ensure the same light-exposure state described above. Then, the threshold voltage of the threshold value detection transistor, which can be regarded as the threshold voltage of the photo detection transistor, is detected. By this means, it is possible to detect the threshold voltage of the photo detection transistor. It is possible to ensure the same transistor characteristics described above by manufacturing the threshold value detection transistor in the same formation process as the formation process of the photo detection transistor without any need for a special manufacturing process. In addition, it is possible to provide a circuit for detecting the threshold voltage of the threshold value detection transistor in a simple circuit configuration. Thus, it is not necessary to provide any analog circuit, signal source, and the like that has a complex circuit configuration for the correction processing. Thus, an optical detection device according to the first aspect of the invention makes it possible to improve detection accuracy while reducing cost that is required for implementing and achieving an optical degradation correction function.

In the configuration of an optical detection device according to the first aspect of the invention described above, it is preferable that the correction coefficient determining section should calculate the correction coefficient that corresponds to the threshold voltage detected at the threshold voltage detecting section on the basis of an arithmetic expression that represents the relationship between the correction coefficient and the threshold voltage. Or, in the configuration of an optical detection device according to the first aspect of the invention described above, it is preferable that the correction coefficient determining section should store a lookup table that represents the relationship between the correction coefficient and the threshold voltage, and should acquire the correction coefficient that corresponds to the threshold voltage detected at the threshold voltage detecting section from the lookup table. Since the relationship between the correction coefficient and the threshold voltage is expressed as an almost linear function, the arithmetic expression that represents such a relationship is simple. That is, an arithmetic circuit that is required for the calculation of a correction coefficient using such a simple arithmetic expression is small, which contributes to cost reduction. On the other hand, if the relationship between the correction coefficient and the threshold voltage is stored as a lookup table, it is not necessary to provide an arithmetic circuit that is required for the calculation of the correction coefficient though a certain memory capacity is required. Therefore, there is no great difference between the arithmetic expression and the lookup table in terms of cost reduction. Therefore, the selection between the arithmetic expression and the lookup table can be arbitrarily made depending on the specification of the optical detection device.

It is preferable that an optical detection device according to the first aspect of the invention described above includes: the optical sensing section that has the optical detection transistor that is an N channel metal oxide semiconductor transistor whose source terminal is connected to a reference potential line and gate terminal is connected to a gate voltage line, the metal oxide semiconductor transistor being hereafter referred to as MOS transistor, a capacitor whose one electrode is connected to the drain terminal of the optical detection transistor and the other electrode is connected to the reference potential line, and a switch that switches the connection of the drain terminal of the optical detection transistor between a first driving voltage line and an output signal line; the threshold voltage detecting section that has the threshold value detection transistor that is an N channel MOS transistor whose drain terminal and gate terminal are connected to each other whereas the source terminal thereof is connected to the reference potential line and further has a resistance element whose one terminal is connected to the drain terminal of the threshold value detection transistor and the other terminal thereof is connected to a second driving voltage line, the resistance element having a resistance value that is set higher than the ON resistance of the threshold value detection transistor and lower than the OFF resistance of the threshold value detection transistor; and a voltage supplying section that supplies a first driving voltage for charging the capacitor to the first driving voltage line, a gate voltage for setting the optical detection transistor into an OFF state to the gate voltage line, a second driving voltage that is higher than the maximum threshold voltage of the threshold value detection transistor to the second driving voltage line, and a reference potential to the reference potential line, wherein the sensor output value generating section controls the switch at the time when the detection of the amount of irradiating light is started so that the drain terminal of the optical detection transistor is connected to the first driving voltage line, and after the lapse of a predetermined length of time through which the capacitor becomes charged completely, the sensor output value generating section controls the switch so that the connection of the drain terminal of the optical detection transistor is switched from the first driving voltage line to the output signal line, and then measures a time constant till the electric potential of the output signal line drops to a predetermined electric potential as the sensor output value; the correction coefficient determining section acquires the voltage of the drain terminal of the threshold value detection transistor as the threshold voltage and determines the correction coefficient that corresponds to the acquired threshold voltage; and the correction processing section corrects the time constant as the sensor output value on the basis of the correction coefficient determined at the correction coefficient determining section. In the preferred configuration of an optical detection device described above, the sensor output value generating section can measure and obtain a time constant till the electric potential of the capacitor charged by means of an optical leakage current of the optical detection transistor (e.g., photo detection transistor) drops to a predetermined electric potential as the sensor output value that relates to the amount of light irradiated to the optical detection transistor. The threshold voltage detecting section is made up of two elements only, which are the threshold value detection transistor and the resistance element. In addition, in comparison with the size of the optical detection transistor, which must be substantially large in order to utilize an optical leakage current, it is possible to make the size of the threshold value detection transistor far smaller because the function of the threshold value detection transistor is only to detect a threshold voltage. Therefore, it is possible to make an area space that is occupied by a circuit that constitutes the threshold voltage detecting section very small. Consequently, a total circuit area space that is occupied by the optical sensing section and the threshold voltage detecting section is reduced. Accordingly, when the optical sensing section and the threshold voltage detecting section are formed on the surface of, for example, a semiconductor substrate or a TFT substrate, it is possible to save space.

In the preferred configuration of an optical detection device described above, it is further preferable that the voltage supplying section should supply the gate voltage for setting the optical detection transistor in the OFF state to the gate voltage line and the second driving voltage that is higher than the maximum threshold voltage of the threshold value detection transistor to the second driving voltage line at least during a time period from the start of the detection of the amount of irradiating light till the completion of the measurement of the time constant and the threshold voltage whereas the gate voltage and the second driving voltage should be changed during other time period. If a fixed bias voltage is continuously applied to the gate terminal of a photo detection transistor and the gate terminal of a threshold value detection transistor during the operation of an optical detection device, the transistor may suffer a characteristic shift due to energization. Because of such a characteristic shift, there is an adverse possibility that an error that is not related to optical degradation occurs in a sensor output value. If the photo detection transistor and the threshold value detection transistor are driven while changing the gate voltage and the second driving voltage as described above, it is possible to prevent such a characteristic shift due to energization from occurring.

In the configuration of an optical detection device according to the first aspect of the invention described above, it is preferable that each of the optical detection transistor and the threshold value detection transistor should be an amorphous silicon thin film transistor. A change in electrical characteristics due to optical degradation is especially conspicuous in an amorphous silicon transistor. Therefore, when each of the optical detection transistor and the threshold value detection transistor is formed as an amorphous silicon transistor, a greater advantageous effect, that is, improvement in detection accuracy, is produced. In addition, when each of the optical detection transistor and the threshold value detection transistor is formed as a thin film transistor (TFT), it is possible to use a conventional TFT manufacturing process, which contributes to cost reduction.

In order to address the above-identified problems without any limitation thereto, an electro-optical device according to a second aspect of the invention includes: a substrate on which a plurality of pixels, a plurality of scanning lines, and a plurality of data lines are formed in a display area, each of the plurality of pixels having a switching transistor; a counter substrate that is provided opposite to the substrate; an electro-optical material that is sandwiched between the substrate and the counter substrate; and the optical detection device according to claim 1, wherein at least the optical sensing section and the threshold voltage detecting section are provided in an area other than the display area over the substrate; and the optical detection transistor and the threshold value detection transistor are formed in the same process as the formation process of the switching transistor over the substrate. In the manufacturing of an electro-optical device according to the second aspect of the invention described above, the pixel switching transistor, the optical detection transistor, and the threshold value detection transistor are formed in the same single process. Therefore, it is possible to manufacture an electro-optical device having an optical detection device at low cost.

It is preferable that an electro-optical device according to the second aspect of the invention described above includes: liquid crystal as the electro-optical material; a backlight; and a backlight controller that controls the amount of the backlight on the basis of the sensor output value that has been corrected at the correction processing section of the optical detection device. With such a preferred configuration, it is possible to control the amount of a backlight accurately depending on the amount of incident light that enters an electro-optical device. Thus, it is possible to improve display quality.

In order to address the above-identified problems without any limitation thereto, an electronic apparatus according to a third aspect of the invention is provided with the electro-optical device according to the second aspect of the invention described above as a display device. By this means, it is possible to provide an electronic apparatus that is provided with a display device (electro-optical device) that achieves low cost and high display quality.

It is preferable that an optical detection device according to the first aspect of the invention described above should further include a light-shielding judging section that makes a judgment as to whether the threshold value detection transistor is in a light-shielded state in which the threshold value detection transistor is not exposed to light or not, wherein the threshold voltage detecting section detects the threshold voltage of the threshold value detection transistor in the light-shielded state judged by the light-shielding judging section. Generally speaking, the threshold voltage of a threshold value detection transistor may vary in correlation with the intensity of illumination when exposed to light. For this reason, if the threshold value detection transistor is exposed to irradiating light during the detection of a threshold voltage, the detected threshold voltage varies depending on the intensity of illumination of the irradiating light. As a result, there is a risk of inaccurate calculation of the degree of optical degradation. If the threshold value detection transistor is driven under a light-shielded condition in which the threshold value detection transistor is not exposed to light at all, it is possible to correctly detect a threshold voltage that represents the degree of optical degradation.

An electronic apparatus should preferably include: a light-shielding unit that puts the threshold value detection transistor into a light-shielded state in which the threshold value detection transistor is not exposed to light; and the electro-optical device according to an aspect of the invention as a display device. By this means, it is possible to provide an electronic apparatus that is provided with a display device (electro-optical device) that achieves low cost and high display quality.

In the configuration of an electronic apparatus according to an aspect of the invention described above, it is preferable that the light-shielding unit should put the optical detection transistor into a light-shielded state in which the optical detection transistor is not exposed to light in addition to putting the threshold value detection transistor into a light-shielded state in which the threshold value detection transistor is not exposed to light. With such a preferred configuration, since the amount of light to which the threshold value detection transistor is exposed is equal to the amount of light to which the optical detection transistor is exposed, it is possible to correctly detect the amount of the optical degradation of the optical detection transistor on the basis of the threshold voltage of the threshold value detection transistor.

The electronic apparatus according to an aspect of the invention described above may be a cellular telephone that has a body part that covers the display unit when the electronic apparatus is not in use and exposes the display unit when the electronic apparatus is in use, wherein the light-shielding unit is provided as the body part. For example, when the electronic apparatus is embodied as a mobile phone that has two body parts and can be folded so that the first body part thereof and the second body part thereof face each other when it is not in use, it is possible to easily shield light by covering the display unit with one body part. In addition, it is possible to judge a light-shielded state easily by detecting the folding operation of the body parts.

The optical detection device according to an aspect of the invention described above may further include a light-shielding unit, wherein the threshold voltage of the threshold value detection transistor is detected with the threshold value detection transistor being put into a light-shielded state in which the threshold value detection transistor is not exposed to light by means of the light-shielding unit. The threshold voltage of a threshold value detection transistor may vary in correlation with the intensity of illumination when exposed to light. For this reason, if the threshold value detection transistor is exposed to irradiating light during the detection of a threshold voltage, the detected threshold voltage varies depending on the intensity of illumination of the irradiating light. As a result, there is a risk of inaccurate calculation of the degree of optical degradation. If the threshold value detection transistor is driven under a light-shielded condition in which the threshold value detection transistor is not exposed to light at all with the use of the light-shielding unit provided on the optical detection device, it is possible to correctly detect a threshold voltage that represents the degree of optical degradation. Therefore, the light-shielding unit may not be provided on an electronic apparatus.

In the configuration of an optical detection device according to an aspect of the invention described above, it is preferable that the light-shielding unit should put the optical detection transistor into a light-shielded state in which the optical detection transistor is not exposed to light in addition to putting the threshold value detection transistor into a light-shielded state in which the threshold value detection transistor is not exposed to light. With such a preferred configuration, since the amount of light to which the threshold value detection transistor is exposed is equal to the amount of light to which the optical detection transistor is exposed, it is possible to correctly detect the amount of the optical degradation of the optical detection transistor on the basis of the threshold voltage of the threshold value detection transistor.

The electro-optical device according to an aspect of the invention described above or the electronic apparatus according to an aspect of the invention described above may be provided with such an optical detection device. By this means, it is possible to provide a display device (electro-optical device) that offers high display quality or an electronic apparatus that is provided with a display device that offers high display quality.

In order to address the above-identified problems without any limitation thereto, an optical degradation correction method according to a fourth aspect of the invention includes: acquiring a signal corresponding to the amount of light irradiated to an optical detection transistor by means of an optical sensing section that has the optical detection transistor; generating a sensor output value that relates to the amount of irradiating light on the basis of the signal acquired in the light amount signal acquisition; detecting the threshold voltage of a threshold value detection transistor by means of a threshold voltage detecting section that has the threshold value detection transistor that is provided adjacent to the optical detection transistor and is formed in the same process as the formation process of the optical detection transistor; determining a correction coefficient that is used for correcting a change in a sensor output value that is caused by the optical degradation of the optical detection transistor and corresponds to the threshold voltage detected in the threshold voltage detection on the basis of a relationship between the correction coefficient and the threshold voltage, the relationship between the correction coefficient and the threshold voltage being predetermined on the basis of a correlation between a change in the sensor output value relative to the degree of the optical degradation of the optical detection transistor and a change in the threshold voltage relative to the degree of the optical degradation of the optical detection transistor; and correcting the sensor output value generated in the sensor output value generation on the basis of the correction coefficient that has been determined in the correction coefficient determination. An optical degradation correction method according to the fourth aspect of the invention makes it possible to improve detection accuracy while reducing cost that is required for implementing and achieving an optical degradation correction function.

In the optical degradation correction method according to the fourth aspect of the invention described above, it is preferable that, in the threshold voltage detection, the threshold voltage of the threshold value detection transistor should be detected in a light-shielded state in which the threshold value detection transistor is not exposed to light. The threshold voltage of a threshold value detection transistor may vary in correlation with the intensity of illumination when exposed to light. For this reason, if the threshold value detection transistor is exposed to irradiating light during the detection of a threshold voltage, the detected threshold voltage varies depending on the intensity of illumination of the irradiating light. As a result, there is a risk of inaccurate calculation of the degree of optical degradation. If the threshold value detection transistor is driven under a light-shielded condition in which the threshold value detection transistor is not exposed to light at all, it is possible to correctly detect a threshold voltage that represents the degree of optical degradation.

BRIEF DESCRIPTION OF THE DRAWINGS

The invention will be described with reference to the accompanying drawings, wherein like numbers reference like elements.

FIG. 17A shows the light-shielding unit that is embodied as a liquid crystal panel, whereas FIG. 17B shows the light-shielding unit that is embodied as a light-shielding plate and an actuator.

DESCRIPTION OF EXEMPLARY EMBODIMENTS

With reference to the accompanying drawings, an optical detection device, an electro-optical device, an electronic apparatus, and an optical degradation correction method according to exemplary embodiments of the present invention will now be explained in detail. The optical detection device may be hereafter referred to as "photo detection device".

Optical Detection Device

Figure 1:
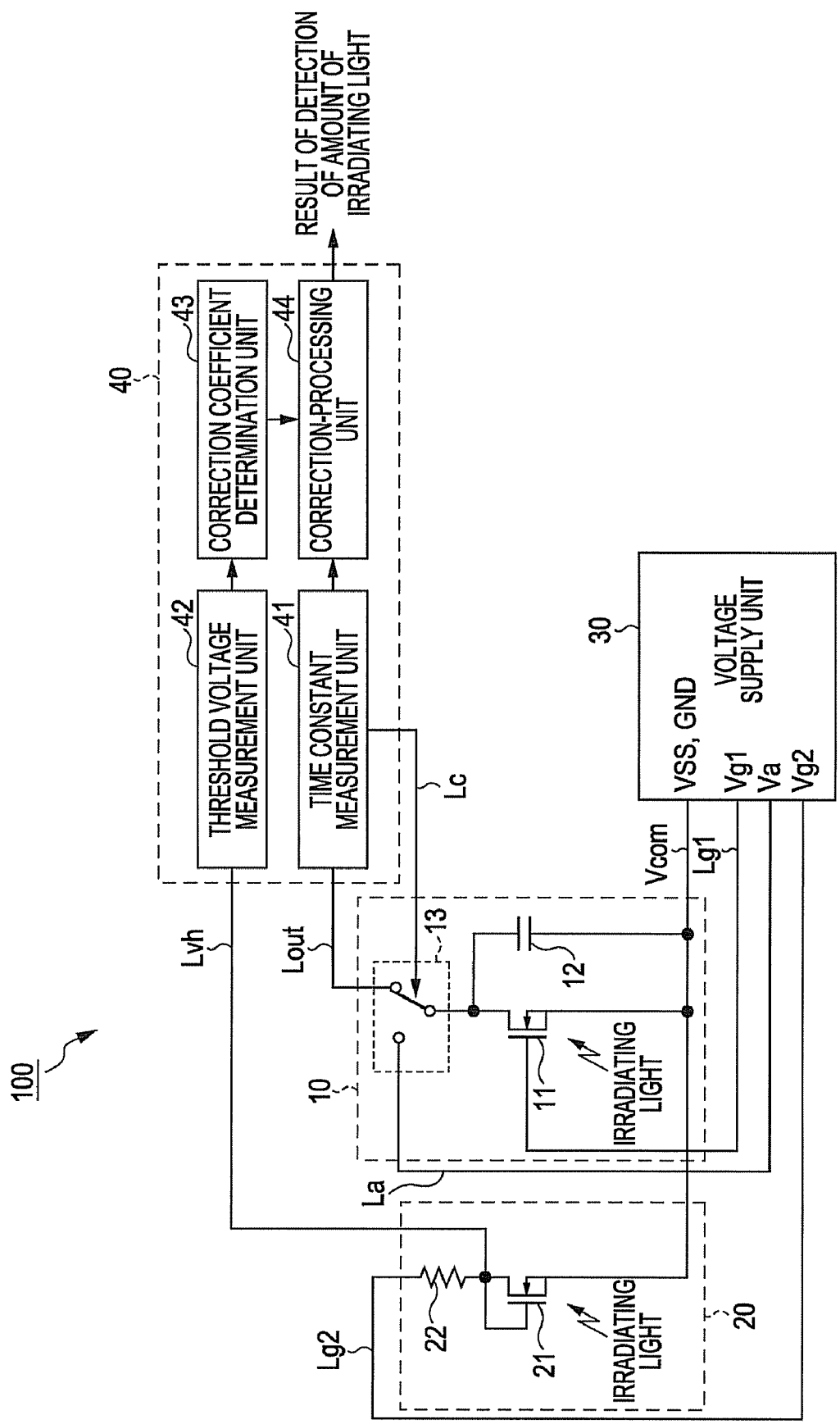
FIG. 1 is a diagram that schematically illustrates an example of the configuration of an optical detection device according to an exemplary embodiment of the invention.

FIG. 1 is a diagram that schematically illustrates an example of the configuration of an optical detection device 100 according to an exemplary embodiment of the invention. As illustrated in FIG. 1, the photo detection device 100 according to the present embodiment of the invention is provided with a photo-sensor unit 10, a threshold voltage detection unit 20, a voltage supply unit 30, and a signal-processing unit 40.

The photo-sensor unit 10 includes a photo detection transistor 11, a capacitor 12, and a switch 13. The photo detection transistor 11 is a transistor that is used/provided for the purpose of optical detection. The photo detection transistor 11 is configured as, for example, an amorphous silicon thin film transistor (TFT). In addition, the photo detection transistor 11 is configured as an N-channel metal oxide semiconductor (MOS), though not necessarily limited thereto. The source terminal of the photo detection transistor 11 is electrically connected to a reference potential line, which is hereafter denoted as Lcom. The gate terminal of the photo detection transistor 11 is electrically connected to a gate voltage line, which is hereafter denoted as Lg1. The drain terminal of the photo detection transistor 11 is electrically connected to one electrode of the capacitor 12.

One electrode of the capacitor 12 mentioned above is electrically connected to the drain terminal of the photo detection transistor 11, whereas the other electrode thereof is electrically connected to the reference potential line Lcom. The switch 13 operates under the control of the signal-processing unit 40, or more specifically, under the control of a time constant measurement unit 41 thereof. Being switched over by the switch 13 under the control of the signal-processing unit 40, the drain terminal of the photo detection transistor 11 is electrically connected to either a first driving voltage line, which is hereafter denoted as La, or an output signal line, which is hereafter denoted as Lout.

The threshold voltage detection unit 20 includes a threshold value detection transistor 21 and a resistance element 22. The threshold value detection transistor 21 is a transistor that is used/provided for the purpose of threshold-value detection. The threshold value detection transistor 21 is provided next to the photo detection transistor 11. In addition, the threshold value detection transistor 21 is manufactured in the same formation process as the formation process of the photo detection transistor 11. That is, the threshold value detection transistor 21 is formed as an amorphous silicon N-channel MOS thin film transistor if the photo detection transistor 11 is formed as an amorphous silicon N-channel MOS thin film transistor as explained above, though not necessarily limited thereto. Since they are manufactured in the same single formation process, the threshold value detection transistor 21 has the same electrical characteristics such as a threshold voltage Vth and the like as those of the photo detection transistor 11. Moreover, since the threshold value detection transistor 21 and the photo detection transistor 11 are arrayed adjacent to each other, the amount of illuminating radiation, that is, irradiating light that enters as a beam of incident light into the threshold value detection transistor 21 is the same as the amount of irradiating light that enters as a beam of incident light into the photo detection transistor 11. That is, the light-exposure state of the threshold value detection transistor 21 is the same as the light-exposure state of the photo detection transistor 11. For this reason, a change in the electrical characteristics of the threshold value detection transistor 21 due to optical degradation tends to be substantially the same as a change in the electrical characteristics of the photo detection transistor 11 due to optical degradation. The source terminal of the threshold value detection transistor 21 is electrically connected to the reference potential line Lcom. The drain terminal of the threshold value detection transistor 21 is electrically connected to the gate terminal thereof and one end of the resistance element 22.

The resistance element 22 has a resistance value that is higher than the ON resistance of the threshold value detection transistor 21 but lower than the OFF resistance thereof. One end of the resistance element 22 mentioned above is electrically connected to the drain terminal of the threshold value detection transistor 21 whereas the other end thereof is electrically connected to a second driving voltage line, which is hereafter denoted as Lg2.

The voltage supply unit 30 supplies a first driving voltage Va to the first driving voltage line La, a gate voltage Vg1 to the gate voltage line Lg1, a second driving voltage Vg2 to the second driving voltage line Lg2, and a reference potential Vss to the reference potential line Lcom. The first driving voltage Va that is supplied to the first driving voltage line La is used for charging the capacitor 12. The gate voltage Vg1 that is supplied to the gate voltage line Lg1 is used for switching the photo detection transistor 11 into an OFF state. The level of the second driving voltage Vg2 that is supplied to the second driving voltage line Lg2 is higher than that of the maximum threshold voltage Vthm of the threshold value detection transistor 21. The reference potential Vss that is supplied to the reference potential line Lcom is set at a ground level (GND) in the configuration of the optical detection device 100 according to the present embodiment of the invention. The threshold voltage Vth of the threshold value detection transistor 21, that is, the threshold value Vth of the photo detection transistor 11, has the following characteristics. As optical degradation progresses due to optical exposure, the threshold value Vth thereof increases. Then, at a certain voltage value, it substantially saturates. A more detailed explanation thereof will be given later. That is, the maximum threshold voltage Vthm mentioned above means a saturated threshold voltage value. With the supply of the second driving voltage Vg2 to the threshold voltage detection unit 20, the level of a voltage outputted at the drain terminal of the threshold value detection transistor 21 is equal to the threshold voltage Vth of the threshold value detection transistor 21.

The signal-processing unit 40 includes a threshold voltage measurement unit 42, a correction coefficient determination unit 43, and a correction-processing unit 44 in addition to the aforementioned time constant measurement unit 41. The time constant measurement unit 41 generates a sensor output value that relates to the amount of irradiating light on the basis of a signal that is inputted from the photo-sensor unit 10 through the output signal line Lout. The time constant measurement unit 41 described in the present embodiment of this specification is a non-limiting example of a "sensor output value generating section" according to an aspect of the invention. More specifically, the time constant measurement unit 41 generates a sensor output value as follows. At the time when the detection of the amount of irradiating light should be started, the time constant measurement unit 41 controls the switch 13 so that the drain terminal of the photo detection transistor 11 becomes electrically connected to the first driving voltage line La. With the lapse of a certain length of time since the start of the light-amount detection, the capacitor 12 becomes charged completely. After the capacitor 12 has become fully charged, the time constant measurement unit 41 controls the switch 13 so that the connection of the drain terminal of the photo detection transistor 11 becomes electrically switched from the first driving voltage line La to the output signal line Lout. Then, the time constant measurement unit 41 measures a time constant $\tau$ therefrom up to when the electric potential, that is, the voltage level, of the output signal line Lout drops to a predetermined electric potential, which constitutes a sensor output value. The time constant measurement unit 41 controls the switch 13 by supplying a control signal thereto through a control line Lc, which provides an electric connection between the switch 13 and the time constant measurement unit 41.

The input terminal of the threshold voltage measurement unit 42 is electrically connected to the drain terminal of the threshold value detection transistor 21 via a threshold value voltage line, which is denoted as Lvh. The threshold voltage measurement unit 42 measures the drain-terminal voltage of the threshold value detection transistor 21 as the threshold voltage Vth. Then, the threshold voltage measurement unit 42 outputs the result of measurement, that is, the threshold voltage Vth, to the correction coefficient determination unit 43.

The correction coefficient determination unit 43 determines a correction coefficient K that corresponds to the threshold voltage Vth measured at the threshold voltage measurement unit 42, that is, the threshold voltage detected at the threshold voltage detection unit 20, on the basis of a relationship between the correction coefficient K and the threshold voltage Vth. The correction coefficient K is a factor that is used for performing correction on a change in a sensor output value, which is expressed as the time constant $\tau$ in the present embodiment of the invention. Such a change in the sensor output value occurs due to the optical degradation of the photo detection transistor 11. The relationship between the correction coefficient K and the threshold voltage Vth is predetermined on the basis of a correlation between a change in the sensor output value relative to the degree of (i.e., progress in) the optical degradation of the photo detection transistor 11 and a change in the threshold voltage Vth relative to the degree of the optical degradation of the photo detection transistor 11, which has been experimentally found in advance. In the present embodiment of the invention, an arithmetic expression that mathematically represents the relationship between the correction coefficient K and the threshold voltage Vth is used. A more detailed explanation thereof will be given later. In other words, the correction coefficient determination unit 43 calculates the correction coefficient K that corresponds to the threshold voltage Vth measured at the threshold voltage measurement unit 42 on the basis of the computing equation that mathematically represents the relationship between the correction coefficient K and the threshold voltage Vth mentioned above.

The correction-processing unit 44 performs correction on the time constant $\tau$ (i.e., sensor output value) that has been measured at the time constant measurement unit 41 on the basis of the correction coefficient K that has been calculated (i.e., determined) at the correction coefficient determination unit 43. Then, the correction-processing unit 44 outputs the corrected time constant $\tau$ to the outside such as an external unit as the detection result of the amount of irradiating light.

Note that the signal-processing unit 40 that includes the time constant measurement unit 41, the threshold voltage measurement unit 42, the correction coefficient determination unit 43, and the correction-processing unit 44 can be embodied and/or configured as a digital arithmetic processing circuit such as an application specific integrated circuit (ASIC) or the like. The following is an example of the operation of such a digital arithmetic processing circuit. The time constant measurement unit 41 performs analog-to-digital conversion on a signal that has been outputted from the photo-sensor unit 10, which has the voltage level of the output signal line Lout. Then, the time constant measurement unit 41 finds the time constant $\tau$ by measuring time taken for the electric potential of the digital-converted signal that is supplied through the output signal line Lout to drop to a predetermined electric potential. On the other hand, the threshold voltage measurement unit 42 performs analog-to-digital conversion on the level of a voltage outputted at the drain terminal of the threshold value detection transistor 21 so as to measure the threshold voltage Vth. Thereafter, the correction coefficient determination unit 43 performs the calculation of the correction coefficient K that corresponds to the threshold voltage Vth measured at the threshold voltage measurement unit 42, which is a digital value, through digital arithmetic processing. The correction-processing unit 44 performs the correction on the time constant $\tau$ that has been measured at the time constant measurement unit 41, which is also a digital value, through digital arithmetic processing.

Figure 2:
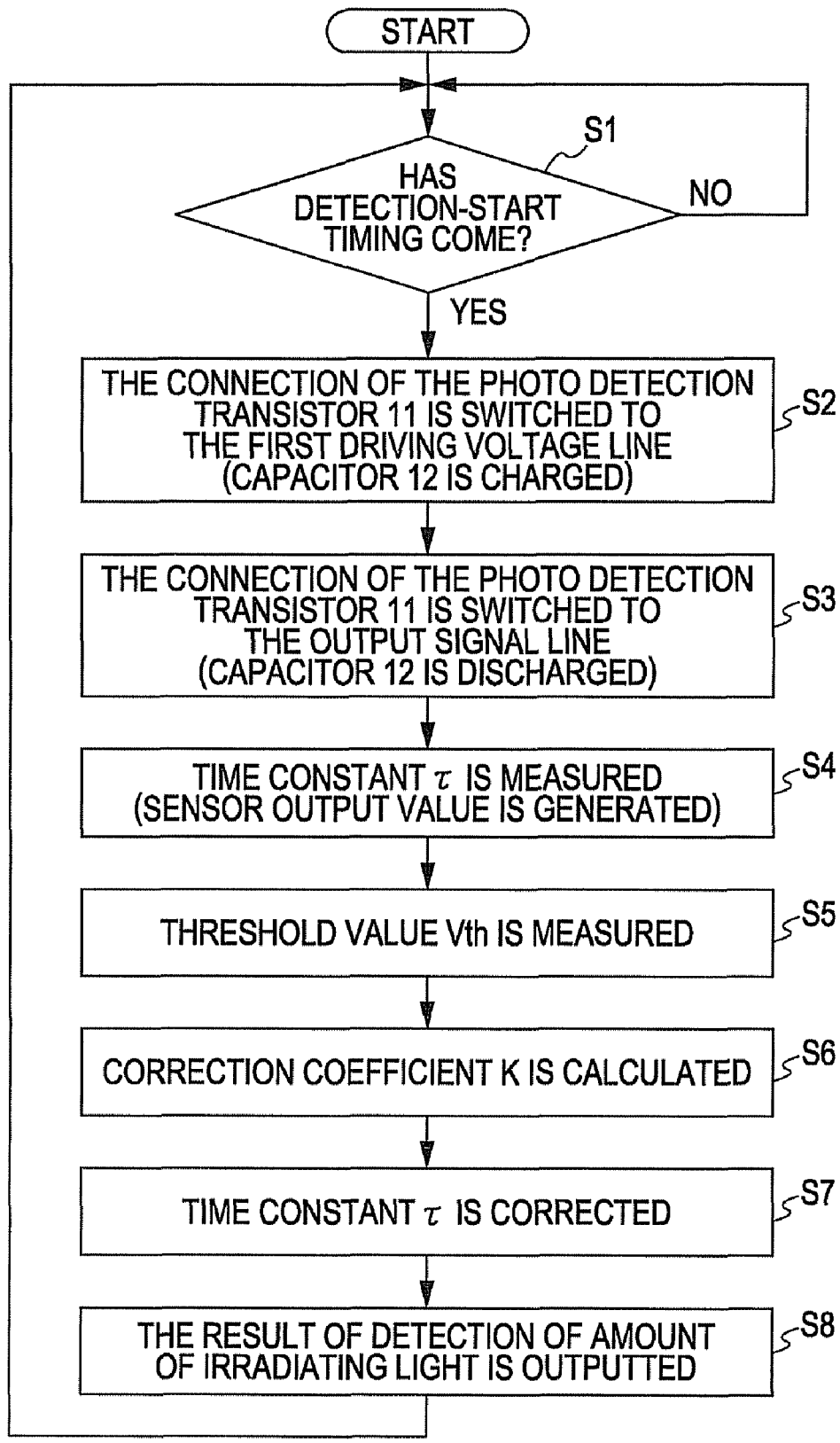
FIG. 2 is a flowchart that schematically illustrates an example of the operation flow of an optical detection device according to an exemplary embodiment of the invention.

Next, the operation of the optical detection device 100 according to the present embodiment of the invention, which has the configuration explained above, will now be explained. In particular, an optical degradation correction method according to the present embodiment of the invention is explained below. FIG. 2 is a flowchart that schematically illustrates an example of the operation flow of the optical detection device 100 according to the present embodiment of the invention. After the power of the optical detection device 100 has been turned ON, the voltage supply unit 30 thereof supplies the first driving voltage Va to the first driving voltage line La, the gate voltage Vg1 to the gate voltage line Lg1, and the second driving voltage Vg2 to the second driving voltage line Lg2. For example, the first driving voltage Va that is supplied to the first driving voltage line La is 2V. The gate voltage Vg1 that is supplied to the gate voltage line Lg1 has a value within a range from, for example, −5V to −3V. The second driving voltage Vg2 that is supplied to the second driving voltage line Lg2 is 8V, though not limited thereto.

As a first step of an optical degradation correction method according to the present embodiment of the invention, as illustrated in FIG. 2, the time constant measurement unit 41 of the signal-processing unit 40 monitors its internal timer so as to judge whether it has reached the point in time for starting the detection of the amount of irradiating light or not (step S1). If it is judged in this first step that the detection-start timing for starting the detection of the irradiating light amount has come (S1: YES), the time constant measurement unit 41 controls the switch 13 so that the drain terminal of the photo detection transistor 11 is electrically connected to the first driving voltage line La (step S2). As a result thereof, the first driving voltage Va is applied to the drain terminal of the photo detection transistor 11. Since the photo detection transistor 11 is in an OFF state at this instant, the capacitor 12 is charged with the first driving voltage Va. Although an optical leakage current flows between the drain terminal of the photo detection transistor 11 and the source terminal thereof because of the irradiation of light, the effect of the optical leakage current on the charging of the capacitor 12 is negligible.

Next, with the lapse of a predetermined length of time since the start of the light-amount detection, the capacitor 12 becomes charged completely. After the capacitor 12 has become fully charged, the time constant measurement unit 41 controls the switch 13 so that the drain terminal of the photo detection transistor 11 is switched from the first driving voltage line La so as to become electrically connected to the output signal line Lout (step S3). In synchronization with this switchover timing, the time constant measurement unit 41 starts to measure the time constant $\tau$ till the electric potential, that is, the voltage level, of the output signal line Lout drops to a predetermined electric potential as a sensor output value (step S4). A series of the steps S2, S3, and S4 described above is a non-limiting example of the "light amount signal acquisition" and the "sensor output value generation" according to an aspect of the invention.

Figure 3:
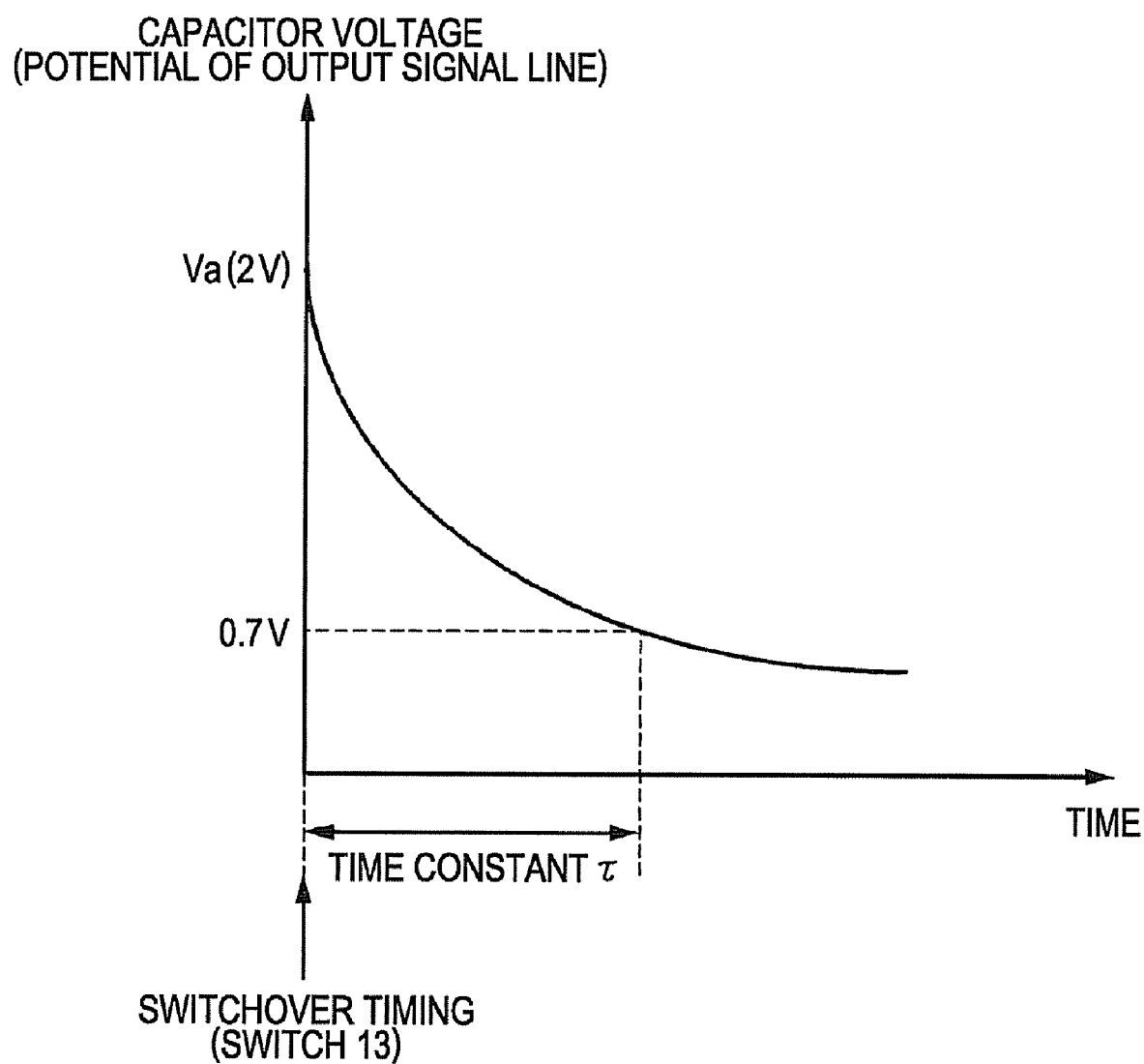
FIG. 3 is a diagram that schematically illustrates an example of the operation of an optical detection device according to an exemplary embodiment of the invention.

FIG. 3 is a graph that shows an example of the electric potential of the output signal line Lout (i.e., capacitor voltage) that changes as time elapses after the drain terminal of the photo detection transistor 11 was switched from the first driving voltage line La so as to become electrically connected to the output signal line Lout. As explained above, an optical leakage current arises due to the irradiation of light between the drain terminal of the photo detection transistor 11 and the source terminal thereof. For this reason, upon the switching in the electric connection of the drain terminal of the photo detection transistor 11 from the first driving voltage line La to the output signal line Lout, electric charge that has accumulated in the capacitor 12 flows through the photo detection transistor 11 and then flows over the reference potential line Lcom in the form of an optical leakage current. As a result, the voltage level of the output signal line Lout, that is, a capacitor voltage, gradually lowers from the initial level of Va (e.g., 2V) after the switchover of the switch 13 as illustrated in FIG. 3. The time constant measurement unit 41 monitors the electric potential of the output signal line Lout that changes with the passage of time. Then, the time constant measurement unit 41 finds the time constant $\tau$ by measuring time taken for the electric potential of the output signal line Lout to drop to a predetermined electric potential, which is, for example, 0.7V.

The level of optical leakage current changes as the amount of light irradiated onto the photo detection transistor 11 changes. Therefore, the time constant $\tau$ also changes in accordance with a change in the amount of irradiating light. Thus, it is possible to obtain information on the amount of irradiating light on the basis of the time constant $\tau$. However, as the optical degradation of the photo detection transistor 11 progresses due to exposure to light, the electrical characteristics of the photo detection transistor 11 changes, which causes an error in the relationship between the time constant $\tau$ and the amount of irradiating light explained above. This error makes it practically impossible or at best difficult to detect the amount of irradiating light accurately. In view of the foregoing, the optical detection device 100 according to the present embodiment of the invention performs correction on the time constant $\tau$, that is, a sensor output value that relates to the amount of irradiating light, in accordance with a correction principle that is explained in detail below.

Principle of Correction Performed on Sensor Output Value

Figure 4:
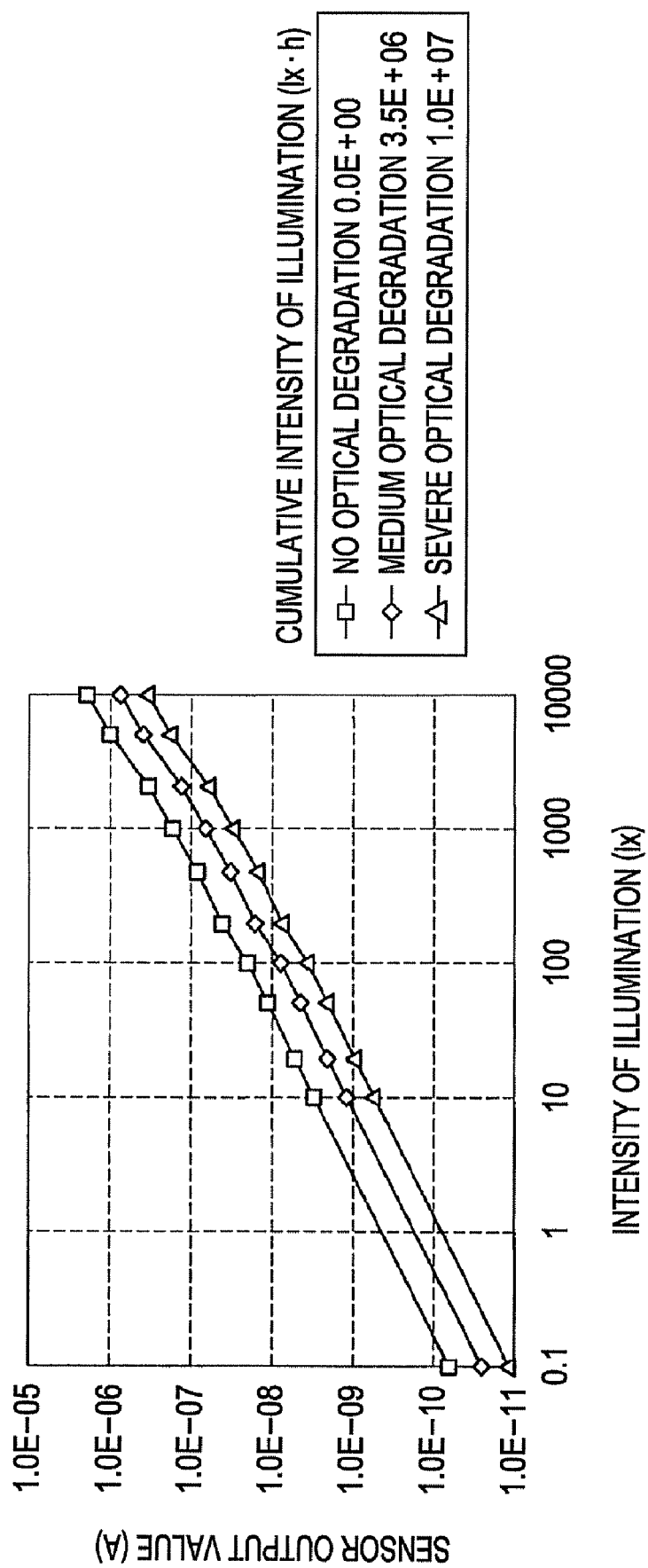
FIG. 4 is a first diagram that schematically illustrates the principle of the optical degradation correction of an optical detection device according to an exemplary embodiment of the invention.

FIG. 4 is a characteristic graph that shows the measurement results of the intensity of illumination and a sensor output value relative to each other for each progress stage in the optical degradation (i.e., degree of optical degradation) of the photo detection transistor 11, where the intensity of illumination is taken as a value that represents the amount of irradiating light whereas the level of an optical leakage current is used as the sensor output value. In the following description of this specification as well as the illustration of the accompanying drawings, the degree of the optical degradation of the photo detection transistor 11 is expressed as a product of the amount of irradiating light to which the photo detection transistor 11 is exposed (i.e., the intensity of illumination) and time. The value obtained by multiplying time by the amount of irradiating light to which the photo detection transistor 11 is exposed is hereafter referred to as "cumulative intensity of illumination". In the illustrated example of FIG. 4, the cumulative intensity of illumination that corresponds to a state in which no optical degradation has occurred yet (i.e., "zero-level" optical degradation) is shown as "0". The cumulative intensity of illumination that corresponds to "medium-level" optical degradation is shown therein as "$3.5 \times 10^6$ (lx·h)". The cumulative intensity of illumination that corresponds to "high-level" optical degradation is shown therein as "$1.0 \times 10^7$ (lx·h)".

It is understood from FIG. 4 that the value of a sensor output for the same intensity of illumination changes as optical degradation progresses. For example, the value of a sensor output that is obtained when optical degradation has become severe, that is, for the high-level optical degradation is lower than the value of a sensor output that is obtained when no optical degradation has occurred yet, that is, for the zero-level optical degradation by approximately 40%. As will be understood from the foregoing description, as the optical degradation of the photo detection transistor 11 progresses due to exposure to light, the electrical characteristics of the photo detection transistor 11 changes, which causes an error in the relationship between the time constant $\tau$ and the amount of irradiating light. This error makes it practically impossible or at best difficult to detect the amount of irradiating light accurately.

Figure 5:
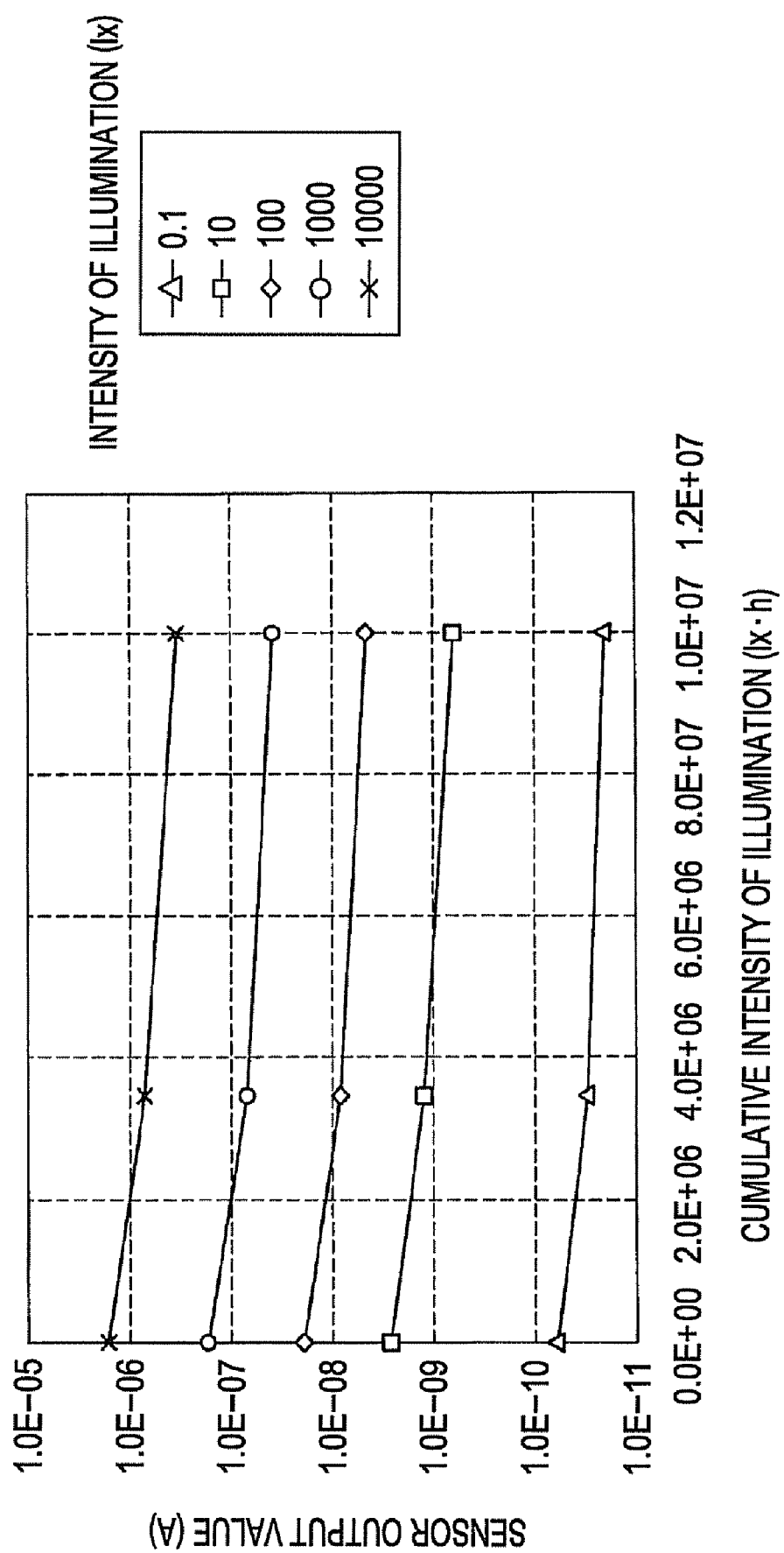
FIG. 5 is a second diagram that schematically illustrates the principle of the optical degradation correction of an optical detection device according to an exemplary embodiment of the invention.

FIG. 5 is a characteristic graph that is derived from FIG. 4 so as to illustrate the relationship between a sensor output value and the cumulative intensity of illumination for each illumination. As illustrated in FIG. 5, it is understood that the ratio of a change in the sensor output value that occurs as the optical degradation progresses, that is, as the cumulative intensity of illumination increases, is substantially the same regardless of detected intensity of illumination.

Figure 6:
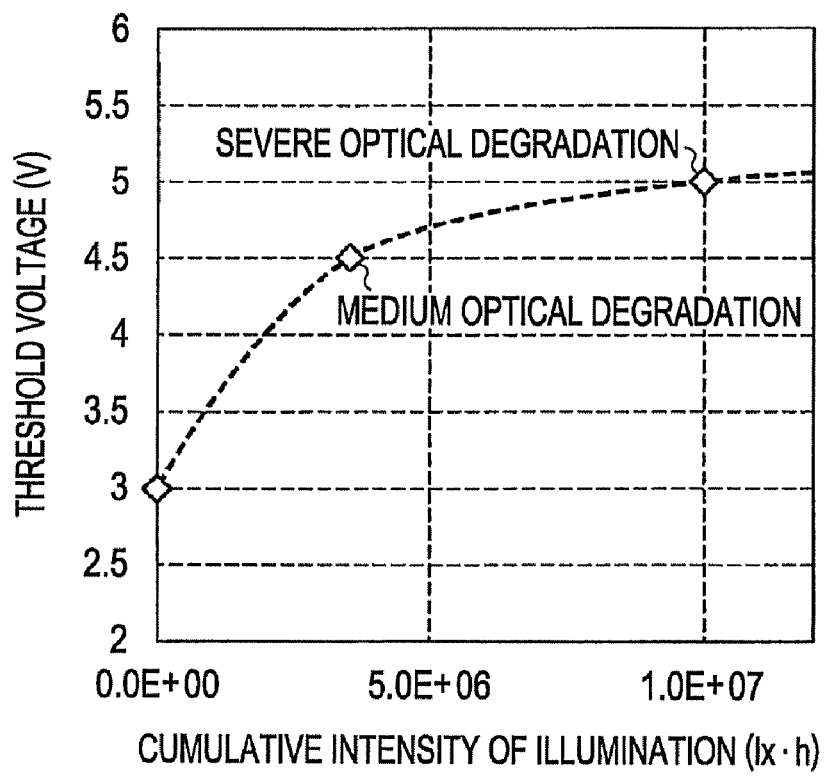
FIG. 6 is a third diagram that schematically illustrates the principle of the optical degradation correction of an optical detection device according to an exemplary embodiment of the invention.

FIG. 6 is a characteristic graph that shows the relationship between the cumulative intensity of illumination and the threshold voltage Vth of the photo detection transistor 11. As illustrated in FIG. 6, it is understood that the threshold voltage Vth under the zero-level optical degradation is approximately 3.0 (V), which goes up to approximately 4.5 (V) under the medium-level optical degradation. The threshold voltage Vth reaches approximately 5.0 (V) under the high-level optical degradation. As will be further understood from FIG. 6, the threshold voltage Vth saturates at 5.5 (V) or lower even when the optical degradation further progresses. Therefore, it follows that the level of the second driving voltage Vg2 that is supplied to the threshold voltage detection unit 20 can be set while using the saturation level of the threshold voltage Vth as a reference.

It is clear from the measurement results shown in FIGS. 5 and 6 that, if the threshold voltage Vth of the photo detection transistor 11 that is subjected to the irradiation of light is known, it is possible to obtain a constant sensor output value regardless of the degree of optical degradation by multiplying a sensor output value by a correction coefficient that corresponds to the known threshold voltage Vth. In other words, if the threshold voltage Vth of the photo detection transistor 11 that is subjected to the irradiation of light is known, it is possible to obtain a sensor output value that is equivalent to one that is obtained under a state in which no optical degradation has occurred yet through such multiplication.

Figure 7:
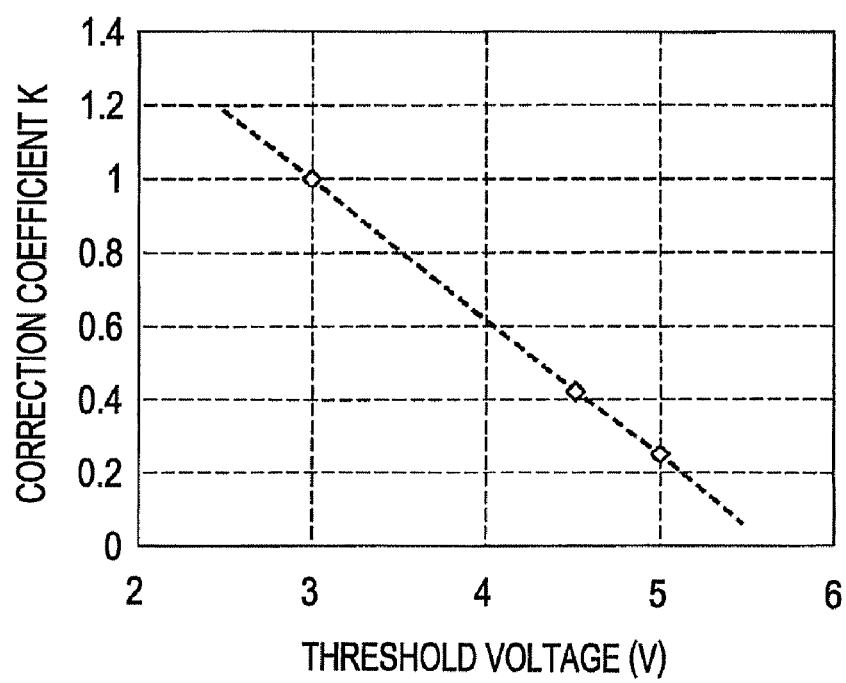
FIG. 7 is a fourth diagram that schematically illustrates the principle of the optical degradation correction of an optical detection device according to an exemplary embodiment of the invention.

FIG. 7 is a characteristic graph that is derived on the basis of measurement results shown in FIGS. 5 and 6 so as to illustrate the relationship between the correction coefficient K and the threshold voltage Vth. As shown in FIG. 7, it is understood that the correction coefficient K is inversely proportional to the threshold voltage Vth, which can be graphically represented as a substantially linear relationship. In addition, the relationship between the correction coefficient K and the threshold voltage Vth can be mathematically expressed as the following arithmetic expression (1).

$$K = -0.378 \cdot Vth + 2.130 \quad (1)$$

In accordance with the arithmetic expression (1) shown above, for example, the correction coefficient K that corresponds to the threshold voltage 4.5 (V) under the cumulative intensity of illumination of "$3.5 \times 10^6$ (lx·h)", which corresponds to the medium-level optical degradation, is determined as 0.42. In addition, the correction coefficient K that corresponds to the threshold voltage 5.0 (V) under the cumulative intensity of illumination of "$1.0 \times 10^7$ (lx·h)", which corresponds to the high-level optical degradation, is determined as 0.25 from the arithmetic expression (1) shown above. When the arithmetic expression (1) shown above is used, the correction of the sensor output value can be performed with the use of the following formula (2).

$$\text{Corrected Sensor Output Value} = \text{Pre-Correction Sensor Output Value} / \text{Correction Coefficient } K \quad (2)$$

Figure 8:
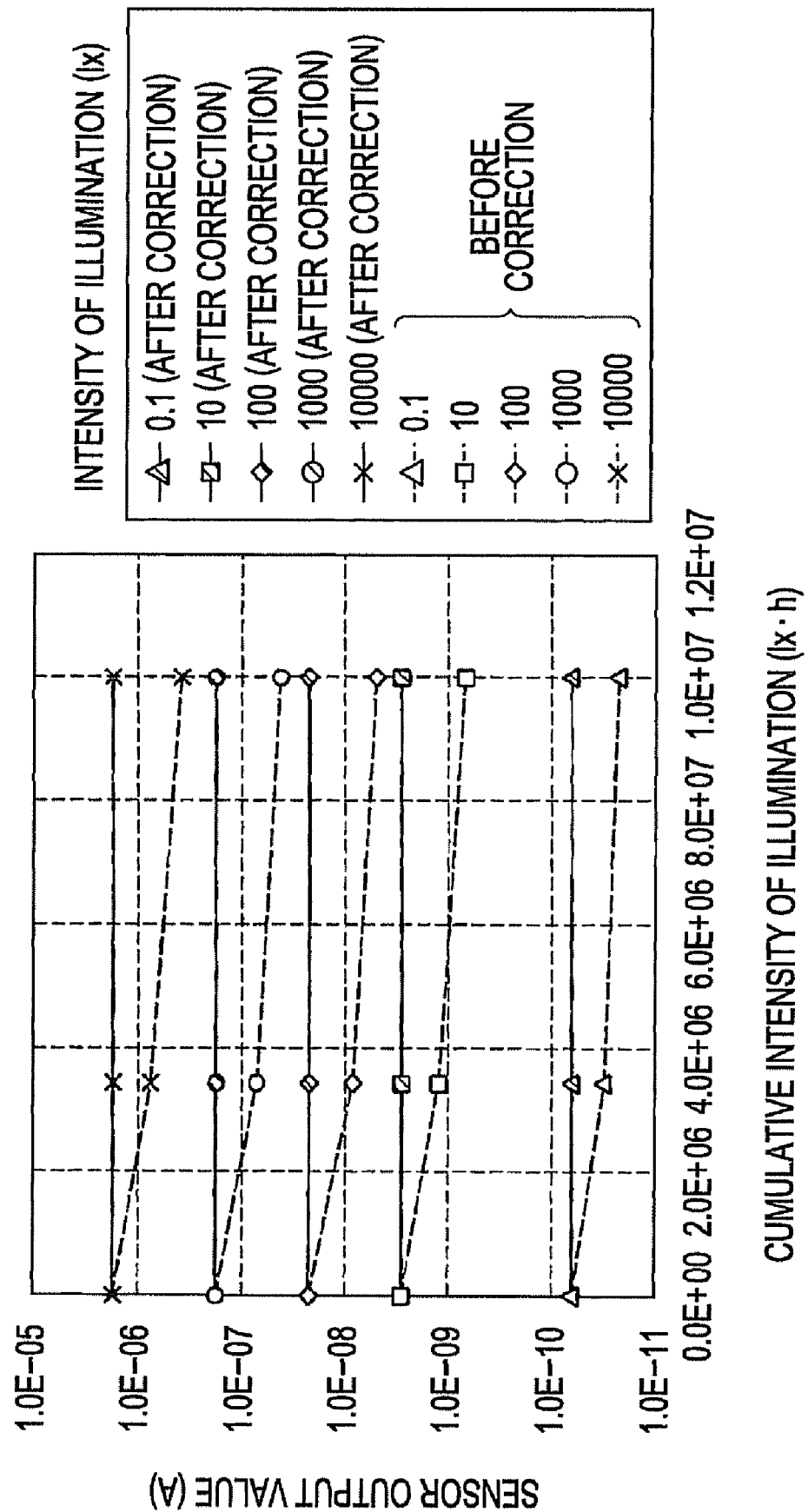
FIG. 8 is a fifth diagram that schematically illustrates the principle of the optical degradation correction of an optical detection device according to an exemplary embodiment of the invention.
Figure 9:
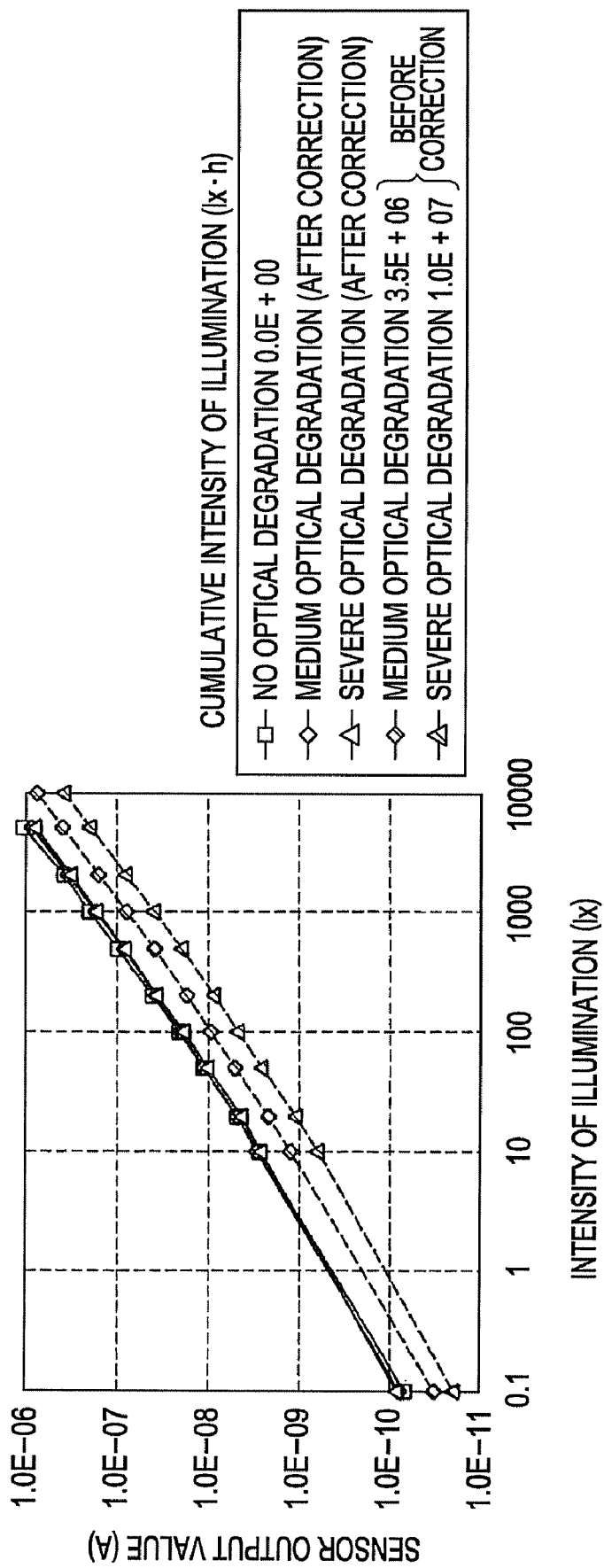
FIG. 9 is a sixth diagram that schematically illustrates the principle of the optical degradation correction of an optical detection device according to an exemplary embodiment of the invention.

FIG. 8 is a characteristic graph that shows the relationship between an uncorrected (i.e., pre-correction) sensor output value and the cumulative intensity of illumination for each illumination and further shows the relationship between a corrected (i.e., post-correction) sensor output value and the cumulative intensity of illumination for each illumination. FIG. 9 is a characteristic graph that shows the relationship between an uncorrected sensor output value and the intensity of illumination for each progress stage in the optical degradation (i.e., degree of optical degradation) of the photo detection transistor 11 and further shows the relationship between a corrected sensor output value and the intensity of illumination for each progress stage in the optical degradation of the photo detection transistor 11. As understood from FIGS. 8 and 9, it is possible to reduce a change in a sensor output value that is attributable to optical degradation by correcting the sensor output value on the basis of the correction coefficient K that has been calculated with the use of the arithmetic expression (1) shown above, thereby making it further possible to obtain a corrected sensor output value that is substantially the same as the value of an initial-state sensor output obtained when no optical degradation has occurred yet.

The principle of correction performed on a sensor output value according to the present embodiment of the invention has been explained in detail above. Next, an explanation of the operation flow of the optical detection device 100 according to the present embodiment of the invention is continued on the basis of the understanding of the sensor output value correction principle according to the present embodiment of the invention. The threshold voltage measurement unit 42 measures a voltage outputted at the drain terminal of the threshold value detection transistor 21 of the threshold voltage detection unit 20 as the threshold voltage Vth (step S5). The step S5 described above is a non-limiting example of the "threshold voltage detection" according to an aspect of the invention. As has already been explained earlier, since the threshold value detection transistor 21 and the photo detection transistor 11 are arrayed adjacent to each other, the amount of illuminating radiation, that is, irradiating light that enters as a beam of incident light into the threshold value detection transistor 21 is the same as the amount of irradiating light that enters as a beam of incident light into the photo detection transistor 11. That is, the light-exposure state of the threshold value detection transistor 21 is the same as the light-exposure state of the photo detection transistor 11. For this reason, a change in the electrical characteristics of the threshold value detection transistor 21 due to optical degradation tends to be substantially the same as a change in the electrical characteristics of the photo detection transistor 11 due to optical degradation. Thus, it is possible to regard the threshold voltage Vth that is measured at the threshold voltage measurement unit 42 as the threshold voltage Vth of the photo detection transistor 11.

Then, the correction coefficient determination unit 43 calculates the correction coefficient K that corresponds to the threshold voltage Vth measured at the threshold voltage measurement unit 42 on the basis of the above computing equation (1) that mathematically represents the relationship between the threshold voltage Vth and the correction coefficient K, which is used for correcting a change in the sensor output value that is caused by the optical degradation of the photo detection transistor 11 (which is the time constant τ herein) (step S6). The step S6 described above is a non-limiting example of the "correction coefficient determination" according to an aspect of the invention. As explained in the section Principle of Correction Performed on Sensor Output Value, the arithmetic expression (1), which mathematically represents the relationship between the correction coefficient K and the threshold voltage Vth, is predetermined on the basis of a correlation between a change in the sensor output value relative to the degree of the optical degradation of the photo detection transistor 11 and a change in the threshold voltage Vth relative to the degree of the optical degradation of the photo detection transistor 11, which has been experimentally found in advance.

Next, the correction-processing unit 44 performs correction on the time constant τ (i.e., sensor output value) that has been measured at the time constant measurement unit 41 on the basis of the correction coefficient K that has been calculated at the correction coefficient determination unit 43 (step S7). The step S7 described above is a non-limiting example of the "sensor output value correction" according to an aspect of the invention. Then, the correction-processing unit 44 outputs the corrected time constant τ to the outside such as an external unit as the detection result of the amount of irradiating light (step S8). Subsequently, the process returns to the step S1 so as to repeat the steps S1-S8 explained above. By this means, each time when the detection-start timing for starting the detection of the amount of irradiating light has come, a series of processing including the measurement of the time constant τ, the measurement of the threshold voltage Vth, the calculation of the correction coefficient K, and the correction of the time constant τ (i.e., sensor output value) is performed. In this way, the result of the detection of the amount of irradiating light is outputted.

As explained in detail above, the inventors of the subject application (i.e., present invention) has found that the threshold voltage Vth is an index that indicates the state of the optical degradation of the photo detection transistor 11 on the basis of a correlation between a change in a sensor output value relative to the degree of the optical degradation of the photo detection transistor 11 and a change in the threshold voltage Vth relative to the degree of the optical degradation of the photo detection transistor 11. The inventors of the subject application has further found that, if the threshold voltage Vth of the photo detection transistor 11 that is subjected to the irradiation of light is known, it is possible to obtain a constant sensor output value regardless of the progress of the optical degradation thereof by multiplying the sensor output value by a correction coefficient that corresponds to the known threshold voltage Vth. In order to detect the threshold voltage Vth of the photo detection transistor 11, the threshold value detection transistor 21 that has the same electrical characteristics as those of the photo detection transistor 11 and is in the same light-exposure state as that of the photo detection transistor 11 is provided. The threshold value detection transistor 21 and the photo detection transistor 11 are arrayed adjacent to each other so as to ensure the same light-exposure state described above. Then, the threshold voltage Vth of the threshold value detection transistor 21, which can be regarded as the threshold voltage Vth of the photo detection transistor 11, is detected. By this means, it is possible to detect the threshold voltage Vth of the photo detection transistor 11. It is possible to ensure the same transistor characteristics described above by manufacturing the threshold value detection transistor 21 in the same formation process as the formation process of the photo detection transistor 11 without any need for a special manufacturing process. In addition, it is possible to provide a circuit for detecting the threshold voltage Vth of the threshold value detection transistor 21 in a simple circuit configuration. Thus, it is not necessary to provide any analog circuit, signal source, and the like that has a complex circuit configuration for the correction processing. Thus, the optical detection device 100 according to the present embodiment of the invention makes it possible to improve detection accuracy while reducing cost that is required for implementing and achieving an optical degradation correction function.

In the foregoing description of an exemplary embodiment of the invention, it is assumed that a fixed bias voltage is continuously applied to the gate terminal of the photo detection transistor 11 and the gate terminal of the threshold value detection transistor 21 during the operation of the optical detection device 100. However, if the optical detection device 100 is driven in such a manner, the TFT element may suffer a characteristic shift due to energization. Because of such a TFT characteristic shift, there is an adverse possibility that an error that is not related to optical degradation occurs in a sensor output value.

In order to prevent such a characteristic-shift error from occurring, it is preferable that the voltage supply unit 30 should have a function of supplying the gate voltage Vg1, which is used for switching the photo detection transistor 11 into an OFF state, to the gate voltage line Lg1 and further supplying the second driving voltage Vg2, which is higher than the maximum threshold voltage Vthm of the threshold value detection transistor 21, to the second driving voltage line Lg2 at least during a time period from the start of the detection of irradiating-light amount, that is, from the start of the step S2, till the completion of the measurement of the time constant τ and the threshold voltage Vth, that is, to the end of the step S5 during the operation of the optical detection device 100. For a time period other than the time period mentioned above, the level of each of the gate voltage Vg1 and the second driving voltage Vg2 should be preferably changed therefrom.

Figure 10:
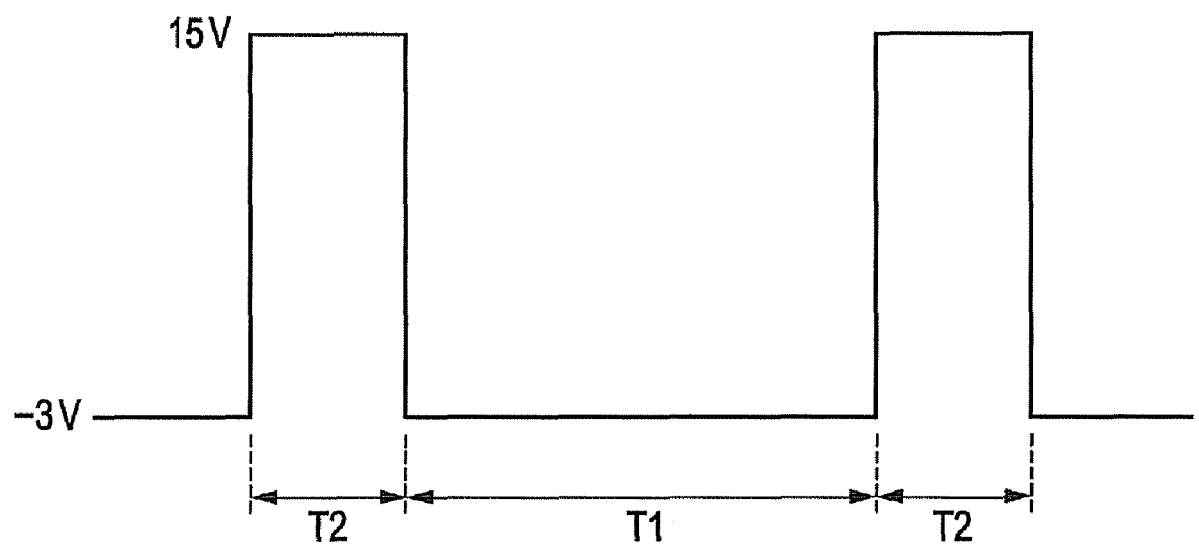
FIG. 10 is a diagram that schematically illustrates a variation example of the operation of an optical detection device according to an exemplary embodiment of the invention.

FIG. 10 is a diagram that schematically illustrates a preferred modification example of the level of the gate voltage Vg1 that is not constant. In the illustrated example of FIG. 10, the level of the gate voltage Vg1 is set at −3V, which is a level at which the photo detection transistor 11 is switched into an OFF state, during a time period T1 from the start of the detection of irradiating-light amount till the completion of the measurement of the time constant τ and the threshold voltage Vth. In addition, the level of the gate voltage Vg1 is set at 15V, which is a level at which the photo detection transistor 11 is switched into an ON state, during other time period T2. Though not illustrated therein, it is preferable to set the level of the second driving voltage Vg2 at a voltage value that is higher than the maximum threshold voltage Vthm of the threshold value detection transistor 21 during the time period T1, which is from the start of the detection of irradiating-light amount till the completion of the measurement of the time constant τ and the threshold voltage Vth. In addition, the level of the second driving voltage Vg2 should be preferably set at a voltage value at which the threshold value detection transistor 21 is switched into an OFF state during the time period T2 other than the time period T1.

If the voltage supply unit 30 has a function described above, it is possible to reduce the characteristic shift of the photo detection transistor 11 and the characteristic shift of the threshold value detection transistor 21, which makes it further possible to detect the amount of irradiating light with greater accuracy. When such a modified configuration is adopted, it is necessary for the voltage supply unit 30 to know a point in time at which the level of the gate voltage Vg1 and the level of the second driving voltage Vg2 should be changed. It is possible to notify such voltage level change timing to the voltage supply unit 30 by supplying a timing notification signal from the signal-processing unit 40 to the voltage supply unit 30.

In the foregoing description of an exemplary embodiment of the invention, it is explained that the correction coefficient determination unit 43 calculates the correction coefficient K that corresponds to the threshold voltage Vth measured at the threshold voltage measurement unit 42 on the basis of the above computing equation (1) that mathematically represents the relationship between the correction coefficient K and the threshold voltage Vth. However, the scope of this aspect of the invention is not limited to such an exemplary configuration. For example, a lookup table that lists the relationship between the correction coefficient K and the threshold voltage Vth may be stored in the internal memory of the correction coefficient determination unit 43. In such a modified configuration, the correction coefficient K that corresponds to the threshold voltage Vth measured at the threshold voltage measurement unit 42 is acquired from the lookup table memorized in the correction coefficient determination unit 43.

It should be noted that the arithmetic expression (1) shown above is nothing more than an example that shows the relationship between the correction coefficient K and the threshold voltage Vth. The electrical characteristics of the photo detection transistor 11 and the electrical characteristics of the threshold value detection transistor 21 vary depending on process conditions. For this reason, needless to say, the arithmetic expression that mathematically represents the relationship between the correction coefficient K and the threshold voltage Vth or the lookup table that shows the relationship between the correction coefficient K and the threshold voltage Vth may be arbitrarily modified in accordance with the process conditions.

In the foregoing description of an exemplary embodiment of the invention, it is explained that the time constant τ, which is correlative to an optical leakage current, is used as a sensor output value that relates to the amount of irradiating light. However, the scope of this aspect of the invention is not limited to such an exemplary configuration. For example, the time constant τ may be converted into the intensity of illumination, which is thereafter subjected to correction with the use of the correction coefficient K. In such a modification example, the corrected intensity of illumination is outputted as the detection result of the amount of irradiating light. Or, the corrected time constant may be converted into the intensity of illumination and then be outputted as the detection result of the amount of irradiating light.

Electro-Optical Device

Figure 11:
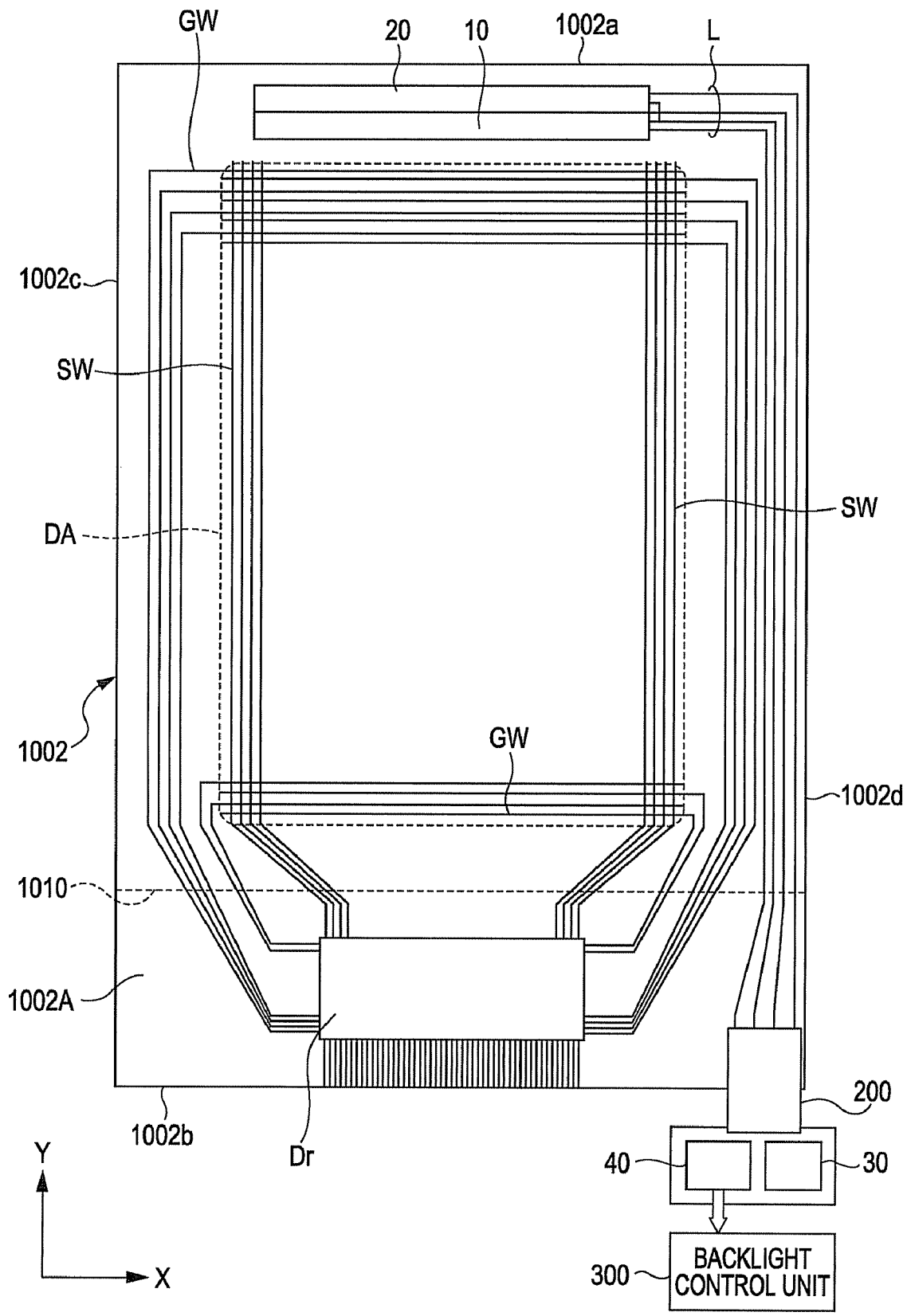
FIG. 11 is a first diagram that schematically illustrates an example of the configuration of a liquid crystal device (electro-optical device) according to an exemplary embodiment of the invention.
Figure 12:
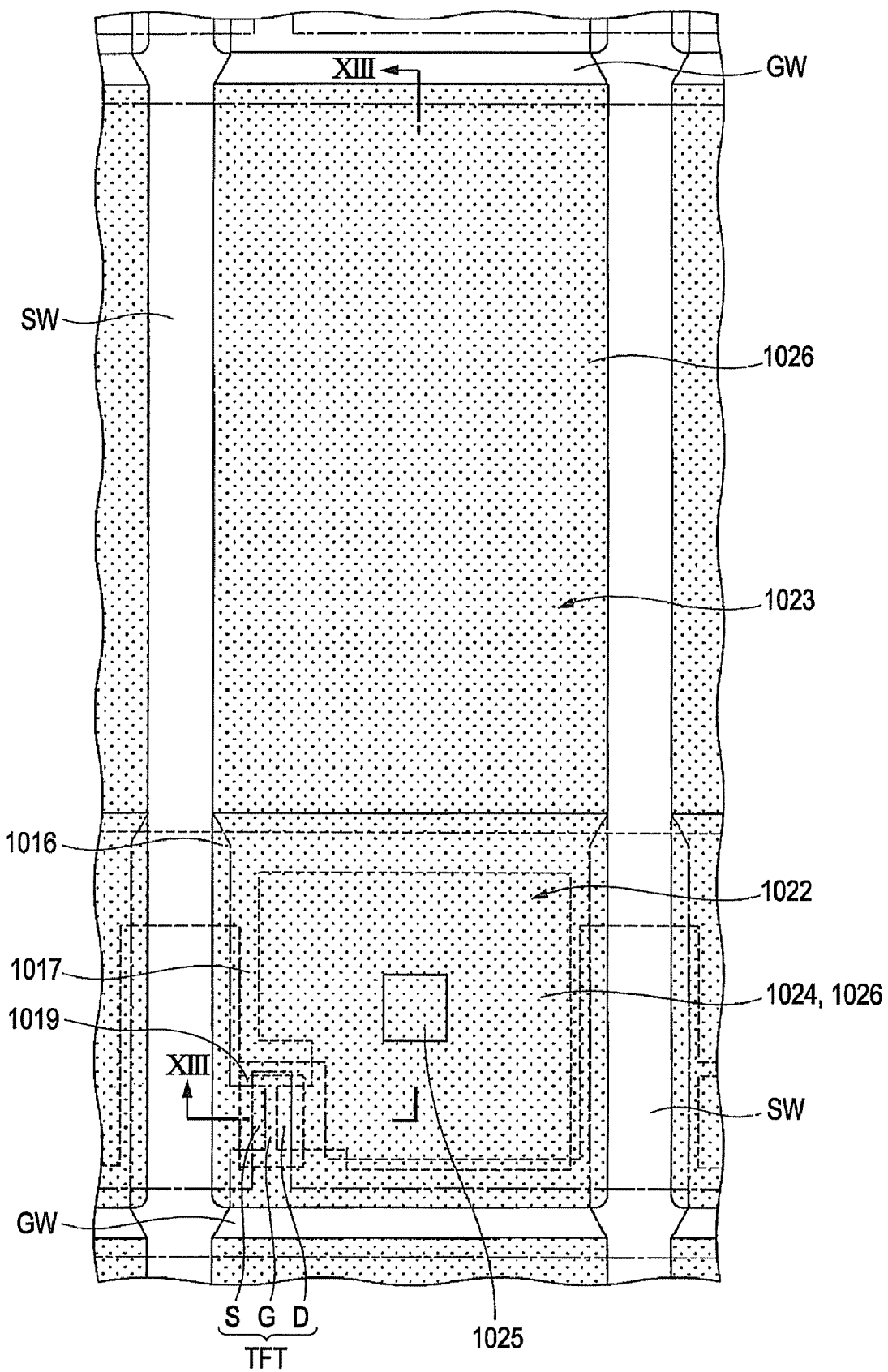
FIG. 12 is a second diagram that schematically illustrates an example of the configuration of a liquid crystal device according to an exemplary embodiment of the invention.
Figure 13:
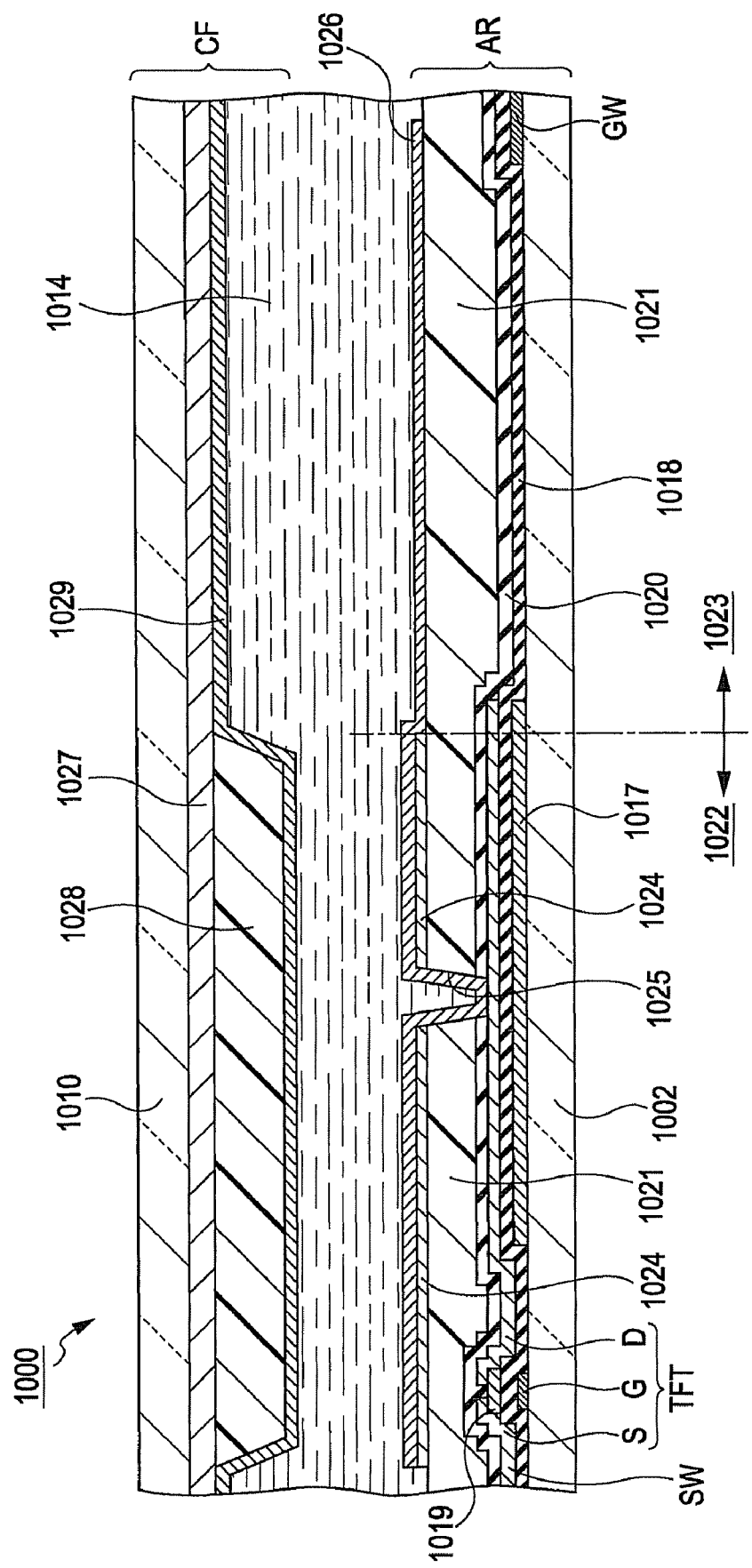
FIG. 13 is a third diagram that schematically illustrates an example of the configuration of a liquid crystal device according to an exemplary embodiment of the invention.

Next, the configuration of an electro-optical device that is provided with the optical detection device 100 according to the foregoing exemplary embodiment of the invention is explained below. In the following description of the configuration of an electro-optical device according to the present embodiment of the invention, a transflective liquid crystal display device is taken as an example. FIG. 11 is a plan view that schematically illustrates an example of the configuration of a liquid crystal display device 1000 according to the present embodiment of the invention; more specifically, FIG. 11 mainly shows an array substrate of the liquid crystal display device 1000, which is an element substrate, whereas a color filter substrate thereof, which is a counter substrate that is provided opposite to the element substrate, is seen through and thus omitted from the drawing. FIG. 12 is a partial plan view that schematically illustrates an example of the configuration of the array substrate shown in FIG. 11 for one pixel. FIG. 13 is a sectional view taken along the line XIII-XIII of FIG. 12.

As illustrated in FIGS. 11 and 13, the liquid crystal display device 1000 according to the present embodiment of the invention is provided with an array substrate AR and a color filter substrate CF that are provided opposite to each other. The base substrate of the array substrate AR is made of a transparent insulating material that has a rectangular shape. For example, the array substrate AR has a transparent substrate 1002 that is made of a glass plate or the like as its base substrate. Various kinds of wiring, lines, and the like are formed and/or patterned over the transparent substrate 1002 so as to make up a part of the array substrate AR. The color filter substrate CF also has a rectangular transparent substrate 1010 that is made of a transparent insulating material as its base substrate. Various kinds of wiring, lines, and the like are formed and/or patterned over the transparent substrate 1010 so as to make up a part of the color filter substrate CF. The size of the array substrate AR is larger than that of the color filter substrate CF so that a protruding part 1002A of the transparent substrate 1002 that has a predetermined protrusion area size is exposed without being covered by the color filter substrate CF when these substrates AR and CF are provided opposite to each other. A sealing material, which is not illustrated in the drawing, is provided on the peripheral area of the array substrate and the peripheral area of the color filter substrate. Liquid crystal 1014 is sealed inside the peripheral sealant area. The liquid crystal 1014 described in the present embodiment of this specification is a non-limiting example of an "electro-optical material" according to an aspect of the invention. In addition, spacers are also sealed inside the peripheral sealant area. The spacers are not illustrated in the drawing.

The array substrate AR has two short sides 1002a and 1002b opposite to each other as well as two long sides 1002c and 1002d opposite to each other. The protruding part 1002A mentioned above is formed at an area extending along and close to the short side 1002b. A semiconductor chip Dr for source driving and gate driving is mounted on the protruding part 1002A. The aforementioned photo-sensor unit 10 is provided at an area extending along and close to the opposite short side 1002a. A backlight, which is not illustrated in the drawing, is provided at the rear of the array substrate AR. The backlight described herein functions as an illuminating unit, a light emission unit, or the like.

A plurality of gate lines GW, which are scanning lines, and a plurality of source lines SW, which are data lines, are formed over one surface of the array substrate AR that faces the color filter substrate CF, which is a surface that contacts the liquid crystal 1014. The gate lines GW are arrayed adjacent to one another with a certain line pitch (i.e., an interval between two adjacent lines) so that each of the gate lines GW extends in the horizontal direction, which is shown as the X direction in FIG. 11. The source lines SW are arrayed adjacent to one another with a certain line pitch so that each of the source lines SW extends in the vertical direction, which is shown as the Y direction in FIG. 11. The source lines SW are electrically insulated from the gate lines GW. In a plan view, these source lines SW and gate lines GW are patterned in a matrix layout. A switching transistor (refer to FIG. 12) and a pixel electrode 1026 (refer to FIG. 13) are formed at each area that is surrounded by the gate lines GW and the source lines SW that intersect with each other. The switching transistor is, for example, an amorphous silicon thin film transistor (TFT). The switching transistor turns ON upon the reception of a scanning signal through the gate line GW. A video signal is supplied from the source line SW via the TFT to the pixel electrode 1026.

Each area surrounded by the gate lines GW and the source lines SW constitutes a so-called pixel. A display area DA includes the plurality of pixels. Each of the gate lines GW extends to a picture frame area that is outside the display area DA so as to be electrically connected to a gate driver. The function of the gate driver is implemented and/or embodied as the semiconductor chip Dr. An example of the semiconductor chip Dr is a large scale integrated circuit (LSI). Each of the source lines SW extends to the picture frame area outside the display area DA so as to be electrically connected to a source driver. The function of the source driver is implemented and/or embodied as the semiconductor chip Dr.

The photo-sensor unit 10 of the optical detection device 100 and the threshold voltage detection unit 20 thereof are provided at the area extending along and close to the short side 1002a of the array substrate AR, which is an area outside the display area DA. Although an area space that is occupied by the photo-sensor unit 10 is shown to be the same as an area space that is occupied by the threshold voltage detection unit 20 in the illustration of FIG. 11 for the purpose of functional explanation, an actual area space that is occupied by the photo-sensor unit 10 is not the same as an actual area space that is occupied by the threshold voltage detection unit 20 in the actual implementation of the invention. Specifically, the actual area space that is occupied by the photo-sensor unit 10 in the actual implementation of the invention is inevitably large because it is necessary to form the photo detection transistor 11 having a considerably large size thereat for detecting the amount of irradiating light with the use of an optical leakage current. On the other hand, it suffices that the actual area space that is occupied by the threshold voltage detection unit 20 in the actual implementation of the invention is very small because the function of the threshold voltage detection unit 20 is only to detect the threshold voltage Vth, which means that it is not necessary for the size of the threshold value detection transistor 21 to be larger than that of each switching transistor TFT provided in the display area DA.

A group of lines L that is made up of the gate voltage line Lg1, the first driving voltage line La, the second driving voltage line Lg2, the reference potential line Lcom, the output signal line Lout, the threshold value voltage line Lvh, and the control line Lc, each of which is illustrated in FIG. 1, is provided at the area extending along and close to the long side 1002d of the array substrate AR, which is an area outside the display area DA. The group of lines L is electrically connected to the voltage supply unit 30 and the signal-processing unit 40 via a flexible printed circuit (FPC) cable 200 provided at the short-side 1002b side. Each of the voltage supply unit 30 and the signal-processing unit 40 is provided as an external circuit.

The optical detection device 100 according to the foregoing exemplary embodiment of the invention is made up of the photo-sensor unit 10 provided over the array substrate AR, the threshold voltage detection unit 20 provided over the array substrate AR, the voltage supply unit 30 provided as an external circuit, and the signal-processing unit 40 provided as an external circuit. The photo detection transistor 11 of the photo-sensor unit 10 and the threshold value detection transistor 21 of the threshold voltage detection unit 20 are manufactured in the same formation process as the formation process of the switching transistors TFT provided in the display area DA.

The output signal of the signal-processing unit 40, that is, the result of the detection of irradiating-light amount, is inputted into a backlight control unit 300, which is provided as an external circuit. On the basis of the result of the detection of irradiating-light amount that is outputted from the signal-processing unit 40, which is the corrected sensor output value, the backlight control unit 300 obtains information on the amount of external light that enters the liquid crystal display device 1000 as incident light. Then, the backlight control unit 300 controls the amount of the backlight that is not illustrated in the drawing on the basis of the known amount of external light.

The semiconductor chip Dr that is provided on the transparent substrate 1002 may be replaced with an integrated circuit (IC) that has, in addition to the functions of a source driver and a gate driver mentioned above, the functions of the voltage supply unit 30, the signal-processing unit 40, and the backlight control unit 300.

Next, the configuration of a pixel is explained below with reference to FIGS. 12 and 13. The gate lines GW are arrayed in parallel with one another at equal intervals in the display area DA over the transparent substrate 1002 of the array substrate AR. The gate electrode G of each switching element TFT extends from the gate line GW. An auxiliary capacitance line 1016 is formed at substantially the center between two gate lines GW arrayed adjacent to each other. An auxiliary capacitance electrode 1017 is formed on the auxiliary capacitance line 1016. The auxiliary capacitance electrode 1017 has a width greater than that of the auxiliary capacitance line 1016.

A gate insulation film 1018, which is made of a transparent insulating material such as silicon nitride, silicon oxide, or the like, is formed over the entire surface of the transparent substrate 1002. The gate insulation film 1018 covers the gate lines GW, the auxiliary capacitance lines 1016, the auxiliary capacitance electrodes 1017, and the gate electrodes G. A semiconductor layer 1019 that is made of amorphous silicon or the like is formed over the gate electrode G with a part of the gate insulation film 1018 being sandwiched therebetween. The plurality of source lines SW is formed on the surface of the gate insulation film 1018 in such a manner that the plurality of source lines SW intersects with the plurality of gate lines GW. The source electrode S of the TFT extends from the source line SW so as to contact the semiconductor layer 1019. In addition, the drain electrode D of the TFT is formed over the gate insulation film 1018 so as to contact the semiconductor layer 1019. The drain electrode D of the TFT is made of the same material as that of the source electrode S thereof and the source line SW.

Each area that is surrounded by the gate lines GW and the source lines SW corresponds to one pixel. The gate electrode G, the gate insulation film 1018, the semiconductor layer 1019, the source electrode S, and the drain electrode D make up a TFT, which is a switching element. The TFT is formed in each pixel. In such a pixel configuration, the drain electrode D of the TFT and the auxiliary capacitance electrode 1017 make up the auxiliary capacitance of each pixel.

A protective insulation film 1020 is formed over the entire surface of the transparent substrate 1002 so as to cover the source lines SW, the TFTs, and the gate insulation film 1018. The protective insulation film 1020, which is a so-called passivation film, is made of an inorganic insulation material, though not limited thereto. An inter-layer film 1021 is formed on the passivation film 1020 so as to extend over the entire surface of the transparent substrate 1002. For example, the inter-layer film 1021 is made of an acrylic resin that contains a negative photographic sensitive material. The inter-layer film 1021 is a so-called planarizing film (i.e., planarization film). The inter-layer film 1021 has an uneven surface at a reflection region (i.e., reflection area or reflection part) 1022 so as to have minute convexes and concaves, which are not illustrated in the drawing. On the other hand, the surface of the inter-layer film 1021 is smooth in a transmission region (i.e., transmission area or transmission part) 1023.

A reflection plate 1024 is formed on the surface of the inter-layer film 1021 at the reflection region 1022 by means of a sputtering method. The reflection plate 1024 is made of, for example, aluminum or aluminum alloy. A contact hole 1025 is formed through the protective insulation film 1020, the inter-layer film 1021, and the reflection plate 1024 at a position corresponding to the drain electrode D of the TFT.

The pixel electrode 1026 is formed in each pixel on the surface of the reflection plate 1024, on the inner wall of the contact hole 1025, and on the surface of the inter-layer film 1021 at the transmission region 1023. The pixel electrode 1026 is made of, for example, indium tin oxide (ITO) or indium zinc oxide (IZO). An alignment film, which is an orientation film, is formed at a layer over the pixel electrode 1026 so as to cover each pixel. The orientation film is not illustrated in the drawing.

The color filter substrate CF has a light-shielding layer that is formed on the surface of the transparent substrate 1010 thereof, which is made of a glass substrate or the like. The light-shielding layer is formed at an area opposite to the gate lines GW and the source lines SW of the array substrate AR when viewed in plan. Note that the light-shielding layer is not illustrated in the drawing. A color filter layer 1027 is formed at an area corresponding to each pixel that is surrounded by the light-shielding layer when viewed in plan. The color filter layer 1027 has, for example, three primary color components of red (R), green (G), and blue (B). A top coating layer 1028 is formed on the surface of the color filter layer 1027 at an area corresponding to the reflection part 1022. A common electrode 1029 and an alignment film (i.e., orientation film) are formed on the surface of the topcoat layer 1028 at an area corresponding to the reflection part 1022 and on the surface of the color filter layer 1027 at an area corresponding to the transmission part 1023. The orientation film is not illustrated in the drawing. The color components of the color filter layer 1027 are not limited to red (R), green (G), and blue (B) explained above. As a non-limiting modification example thereof, the color components of the color filter layer 1027 may include cyan (C), magenta (M), and yellow (Y) in place of red (R), green (G), and blue (B). The color filter layer 1027 may be omitted for monochrome display.

The array substrate AR having the structure explained above and the color filter substrate CF having the structure explained above are bonded to each other with the use of the aforementioned sealing material provided therebetween. Finally, the liquid crystal 1014 is injected into an inner space between these substrates as enclosed by the sealant, which is not illustrated in the drawing. Through these processes, the transflective liquid crystal display device 1000 according to the present embodiment of the invention is manufactured. A backlight or a sidelight having a well-known configuration that includes a light source, an optical waveguide board, a light diffusion sheet, and the like are provided under the transparent substrate 1002 of the array substrate AR. Note that these optical components are not illustrated in the drawing. If the reflection plate 1024 is formed at an entire area under the pixel electrode 1026, a reflective liquid crystal display panel is manufactured. In the configuration of a reflective liquid crystal display device that is provided with such a reflective liquid crystal display panel, a front light is used in place of the backlight or the sidelight mentioned above.

The liquid crystal display device 1000 according to the present embodiment of the invention, which is provided with the optical detection device 100 according to the foregoing exemplary embodiment of the invention, makes it possible to accurately control the amount of its backlight depending on the amount of incident light, which enters the liquid crystal display device 1000. Therefore, the liquid crystal display device 1000 according to the present embodiment of the invention achieves improved display quality. Specifically, the liquid crystal display device 1000 according to the present embodiment of the invention performs light control so that the emission amount of the backlight is large under bright ambient conditions such as under daylight whereas the emission amount of the backlight is small under dark ambient conditions, an example of which is use in the night. By this means, it is possible to display an image with appropriate light emission amount that is suited under the operation environment thereof.

In the foregoing description of an exemplary embodiment of the invention, the liquid crystal display device 1000 is taken as an example of various kinds of electro-optical devices provided with the optical detection device 100. However, the scope of this aspect of the invention is not limited to such an exemplary configuration. For example, the invention is applicable to, without any limitation thereto, an organic electroluminescent (EL) display that employs organic EL as its electro-optical material, a twist ball display that uses a twist ball having different paint colors for areas different in polarity as its electro-optical material, a toner display that uses a black toner as its electro-optical material, and a plasma display that uses high pressure gas such as helium, neon, or the like as its electro-optical material.

Electronic Apparatus

Figure 14:
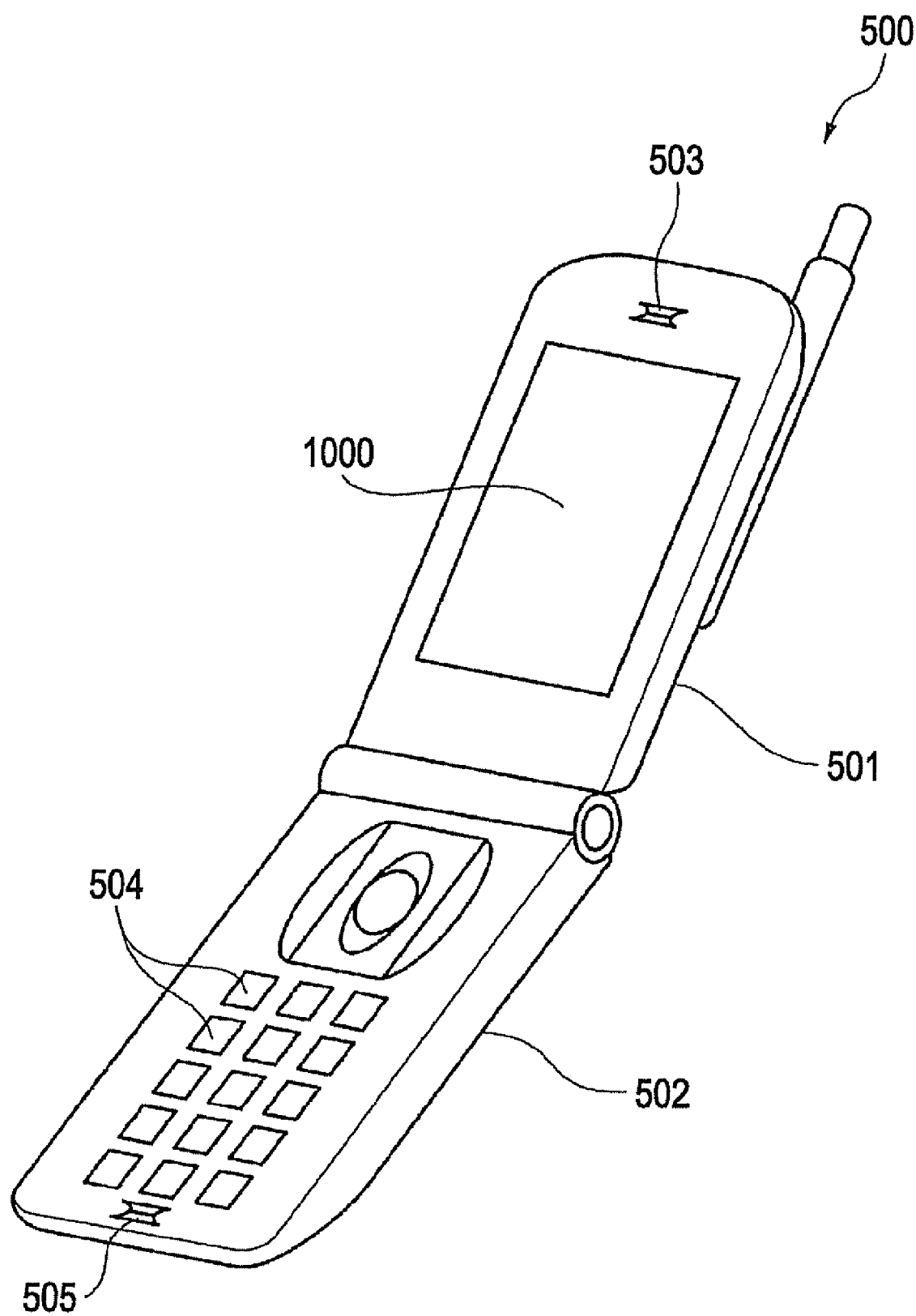
FIG. 14 is an external view that schematically illustrates an example of the general appearance of a mobile phone terminal (electronic apparatus) according to an exemplary embodiment of the invention.

Next, the configuration of an electronic apparatus that is provided with an electro-optical device (e.g., liquid crystal display device 1000) according to the foregoing exemplary embodiment of the invention is explained below. In the following description of the configuration of an electronic apparatus according to the present embodiment of the invention, a mobile phone terminal is taken as an example. FIG. 14 is an external view that schematically illustrates an example of the general appearance of a mobile phone terminal 500 according to an exemplary embodiment of the invention. As shown in FIG. 14, the mobile phone terminal 500 according to the present embodiment of the invention is made up of a first body part 501 and a second body part 502 that are hinge-jointed to each other in a collapsible manner. The liquid crystal display device 1000 having the configuration explained above is provided on the first body part 501 of the mobile phone terminal 500 as a display unit. In addition, a speech output speaker 503, which is an earpiece, is provided on the first body part 501 of the mobile phone terminal 500. Manual operation keys 504 that are made up of various kinds of keys such as ten keys, a function key, a power key, and the like are provided on the second body part 502 of the mobile phone terminal 500. In addition, a speech input microphone 505, which is a mouthpiece, is provided on the second body part 502 of the mobile phone terminal 500.

The mobile phone terminal 500 according to the present embodiment of the invention, which is provided with the liquid crystal display device 1000 as its display unit, performs light control so that the emission amount of the backlight is large under bright ambient conditions such as under daylight whereas the emission amount of the backlight is small under dark ambient conditions, an example of which is use in the night. Therefore, it is possible to display an image with appropriate light emission amount that is suited under the operation environment thereof.

Although exemplary embodiments of the present invention as well as some modification examples thereof are described above with the accompanying illustrations, needless to say, the invention is in no case restricted to these exemplary embodiments and modification examples described herein; the invention may be configured in an adaptable manner in a variety of other variations and/or modifications inclusive of First Variation Example, Second Variation Example, and Other Variation Examples described below as well as those not specifically described or illustrated herein without departing from the spirit and scope thereof.

In the foregoing description of exemplary embodiments of the invention, it is explained that the threshold voltage Vth relative to the cumulative intensity of illumination, the latter of which is a product of the amount of irradiating light (i.e., illumination intensity) and time, can be expressed as a characteristic curve shown in FIG. 6. Generally speaking, the threshold voltage of a transistor whose semiconductor layer 1019 is made of amorphous silicon or the like may change depending on the illumination intensity of light to which the transistor is exposed (e.g., external light). For this reason, in the measurement of the threshold voltage Vth in the operation flow of the foregoing exemplary embodiment of the invention, which is shown as the step S5 in FIG. 2, the threshold voltage of the threshold value detection transistor 21 that is to be measured in accordance with the degree of optical degradation that depends on the cumulative intensity of illumination may vary depending on the illumination intensity of light to which the threshold value detection transistor 21 is exposed at the time of measurement. In other words, the value of the threshold voltage Vth shown in the characteristic graph of FIG. 6 may shift depending on the illumination intensity of light to which the threshold value detection transistor 21 is exposed at the time of measurement.

Figure 15:
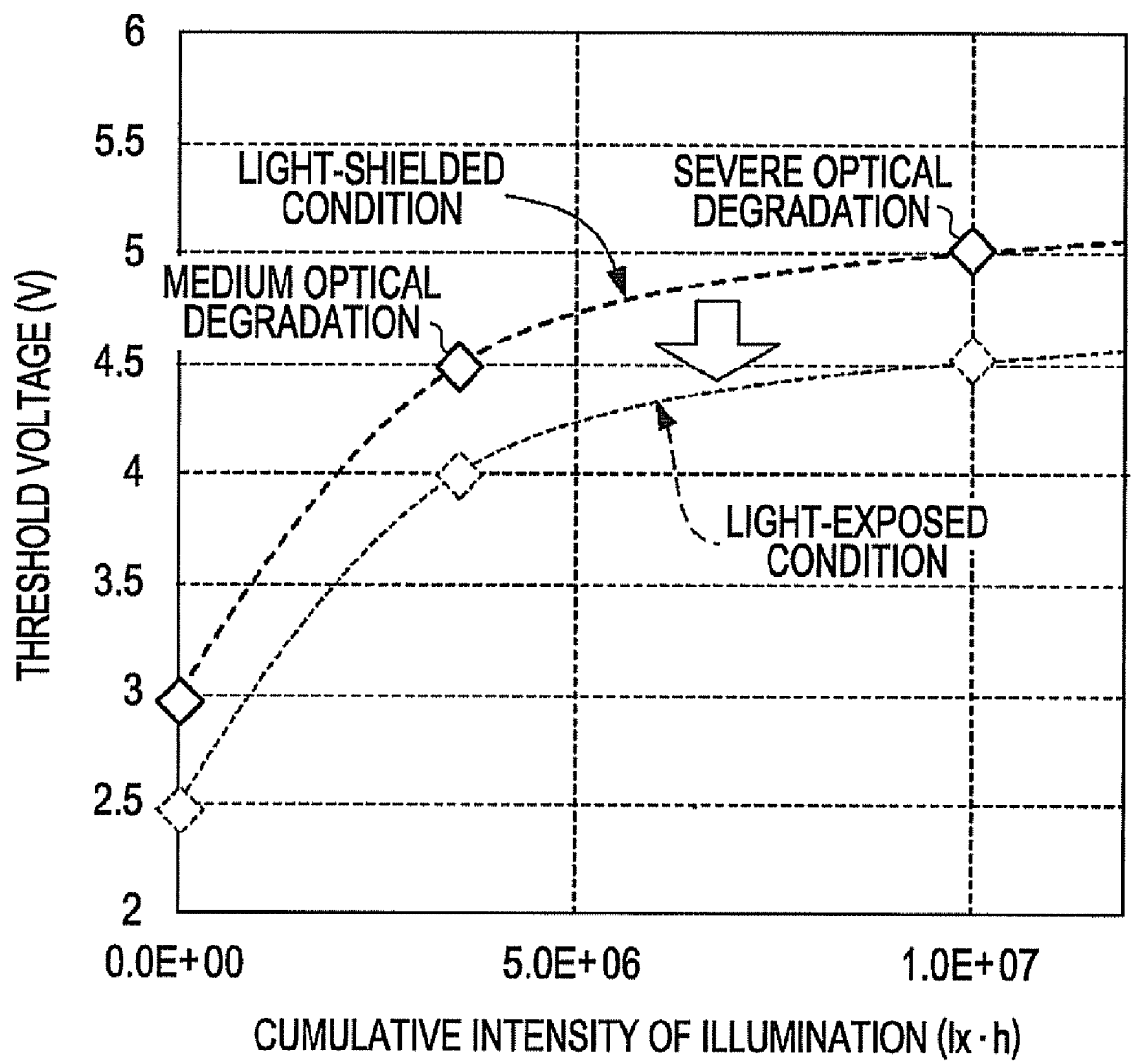
FIG. 15 is a diagram that schematically illustrates an example of a change in the level of a threshold voltage depending on light-irradiating conditions.

For example, if it is assumed that the characteristic curve of FIG. 6 shows the relationship between the cumulative intensity of illumination and the threshold voltage under a light-shielded condition in which the threshold value detection transistor 21 is shielded from light, the threshold value that is measured under a light-exposed condition in which the threshold value detection transistor 21 is exposed to light varies depending on the illuminating intensity thereof. Therefore, as illustrated in the characteristic graph of FIG. 15, the value of the threshold voltage that is measured for each cumulative intensity of illumination under the light-exposed condition is lower than that measured under the light-shielded condition. Or, if it is assumed that the characteristic curve of FIG. 6 shows the relationship between the cumulative intensity of illumination and the threshold voltage under a certain light-exposed condition in which the threshold value detection transistor 21 is exposed to light having a predetermined intensity of illumination, the value of the threshold voltage that is actually measured for each cumulative intensity of illumination could be higher or lower than that shown by the characteristic curve of FIG. 6 depending on the illuminating intensity thereof. Consequently, it is practically impossible, or at best difficult, to calculate the correction coefficient K as a function of the degree of optical degradation accurately on the basis of the threshold voltage Vth.

In order to provide a solution to such a difficulty in calculating the correction coefficient K accurately, as variation examples of the foregoing exemplary embodiment of the invention, the threshold voltage of the threshold value detection transistor 21 is detected under the light-shielded condition in which the threshold value detection transistor 21 is shielded from light. By this means, it is possible to correctly detect a threshold voltage that represents the degree of optical degradation by driving the threshold value detection transistor 21 under the light-shielded condition in which the threshold value detection transistor 21 is not exposed to light at all.

First Variation Example

As a first variation example of the foregoing exemplary embodiment of the invention, a light-shielding unit that ensures that the threshold value detection transistor 21 is shielded from light at the time of threshold voltage measurement is provided on an optical detection device. With such a light-shielding unit, it is possible to correctly detect a threshold voltage that represents the degree of optical degradation by driving the threshold value detection transistor 21 under the light-shielded condition in which the threshold value detection transistor 21 is not exposed to light at all.

Figure 16:
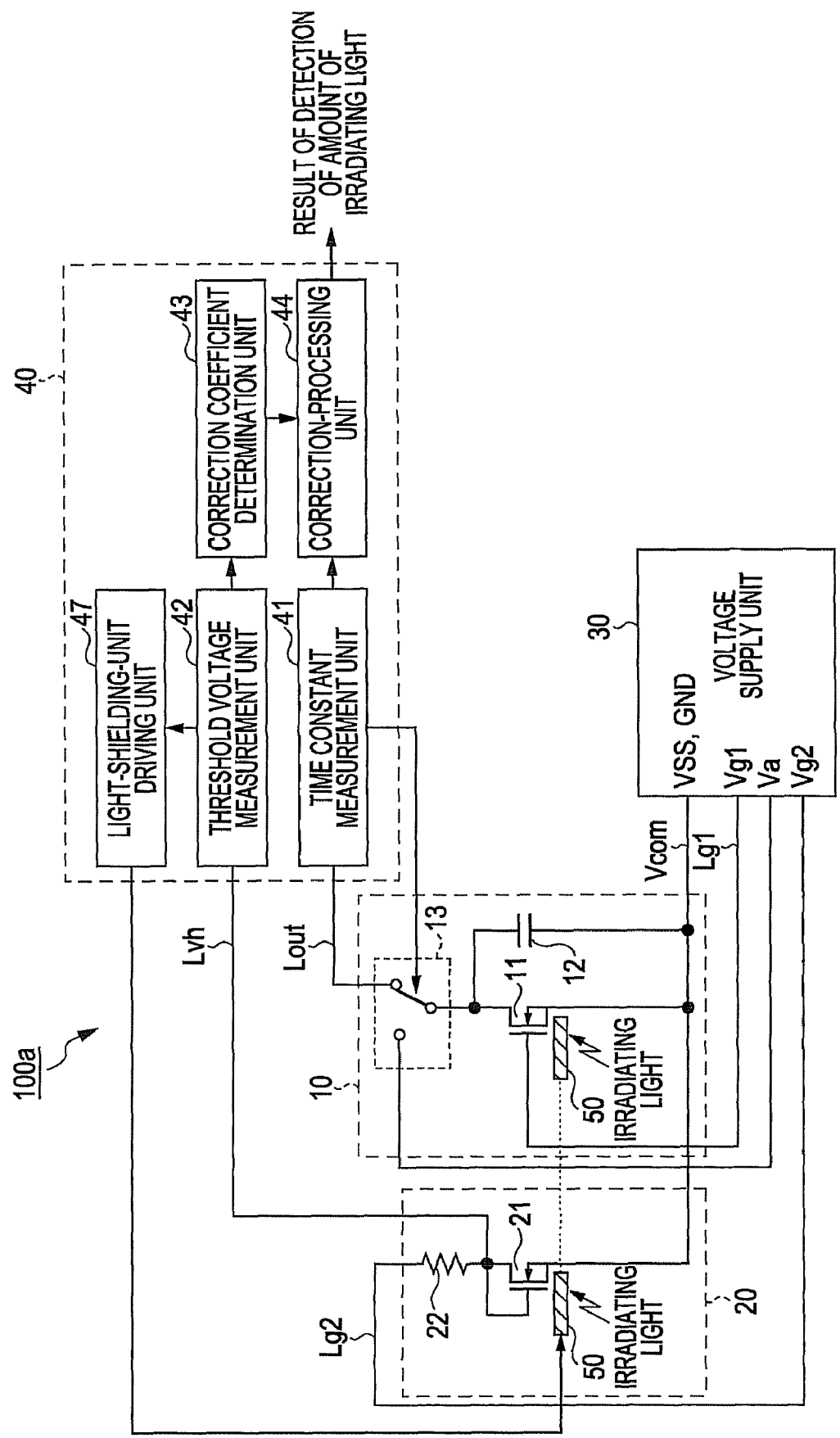
FIG. 16 is a diagram that schematically illustrates an example of the configuration of an optical detection device according to a first variation example of an exemplary embodiment of the invention.
Figure 17A:
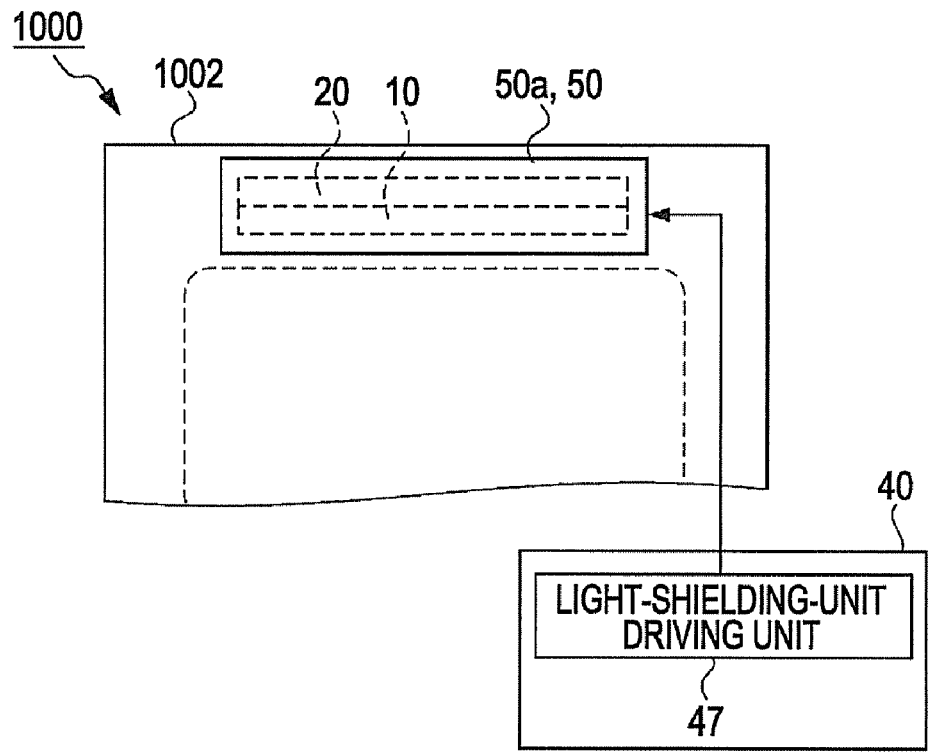
FIGS. 17A and 17B are a set of diagrams that schematically illustrates an example of the light-shielding unit of an optical detection device according to a first variation example of an exemplary embodiment of the invention; more specifically.
Figure 17B:
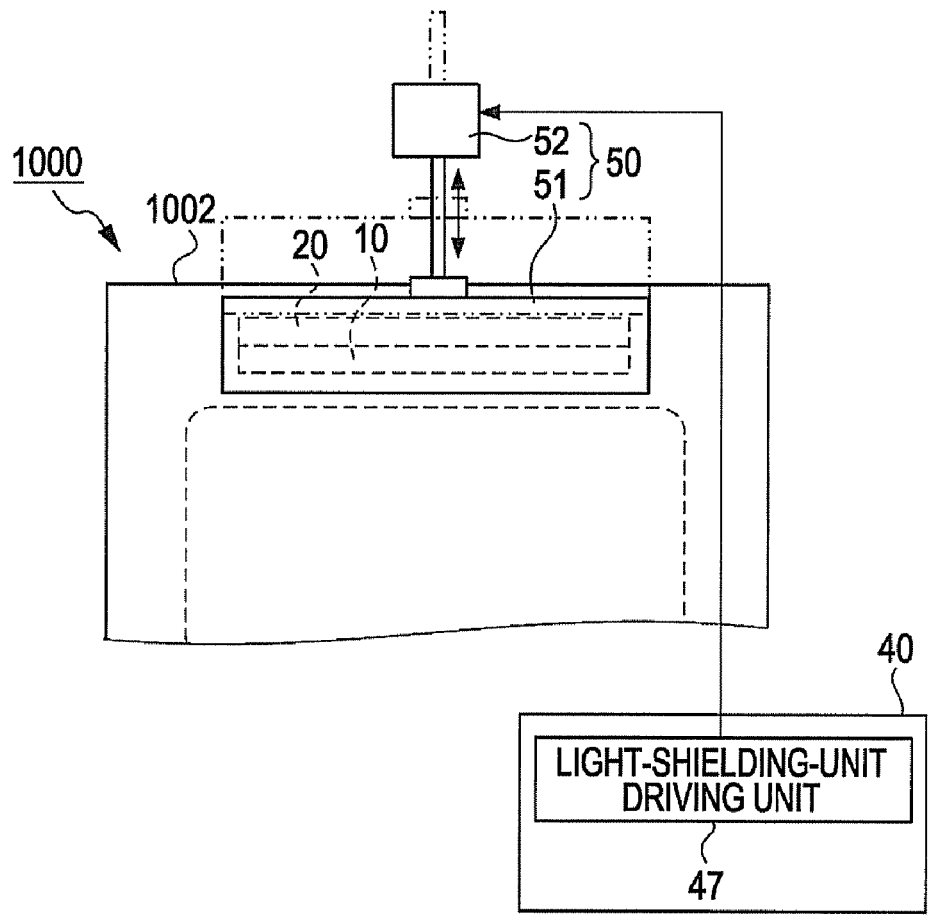
Figure 18:
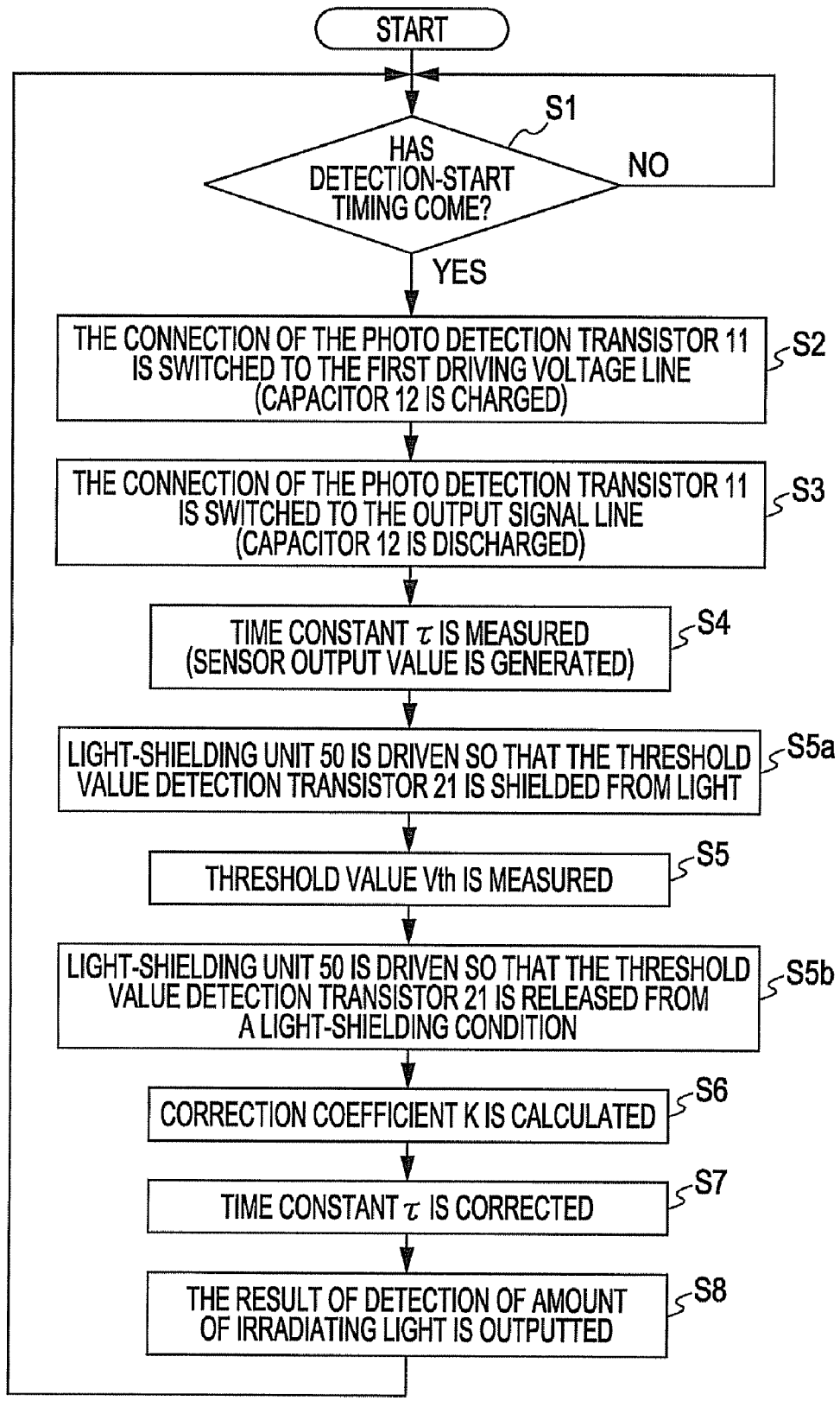
FIG. 18 is a flowchart that schematically illustrates an example of the operation flow of an optical detection device according to the first variation example of an exemplary embodiment of the invention.

With reference to FIGS. 16, 17, and 18, the configuration of an optical detection device according to the first variation example of an exemplary embodiment of the invention, the configuration of a light-shielding unit according thereto, and the detection of irradiating light amount according thereto are explained below. FIG. 16 is a diagram that schematically illustrates an example of the configuration of an optical detection device 100a according to the first variation example of an exemplary embodiment of the invention. FIG. 17A is a diagram that schematically illustrates an example of the configuration of a light-shielding unit according to the first variation example of an exemplary embodiment of the invention; and FIG. 17B is a diagram that schematically illustrates another example of the configuration of a light-shielding unit according to the first variation example of an exemplary embodiment of the invention. FIG. 18 is a flowchart that schematically illustrates an example of the operation flow of the optical detection device 100a according to the first variation example of an exemplary embodiment of the invention.

As illustrated in FIG. 16, the optical detection device 100a is provided with a light-shielding unit 50 and a light-shielding-unit driving unit 47 in addition to the components of the optical detection device 100 according to the foregoing exemplary embodiment of the invention. The light-shielding-unit driving unit 47 is provided in the signal-processing unit 40. The components of the optical detection device 100a according to the first variation example except for the light-shielding unit 50 and the light-shielding-unit driving unit 47 are the same as those of the optical detection device 100 according to the foregoing exemplary embodiment of the invention. In the following description of the optical detection device 100a according to the first variation example as well as the illustration of the accompanying drawings, the same reference numerals are consistently used for the same components as those of the optical detection device 100 according to the foregoing exemplary embodiment of the invention. Accordingly, the configuration of the light-shielding unit 50 and the light-shielding-unit driving unit 47 as well as the operation thereof is explained herein. Any redundant explanation is omitted.

In the configuration of the optical detection device 100a according to the first variation example, the light-shielding unit 50 is configured to shut off light that is otherwise irradiated to the photo-sensor unit 10 and the threshold voltage detection unit 20. Examples of the configuration of the light-shielding unit 50 are shown in FIG. 17. FIG. 17A is a diagram that schematically illustrates an example of the configuration of the light-shielding unit 50, which is provided as a liquid crystal panel 50a in the illustrated example. The liquid crystal panel 50a is provided so as to cover the photo-sensor unit 10 and the threshold voltage detection unit 20. The liquid crystal panel 50a optically modulates its liquid crystal by supplying a driving signal that has a predetermined driving voltage to the liquid crystal. By this means, the liquid crystal panel 50a ensures that the photo-sensor unit 10 and the threshold voltage detection unit 20 are shielded from light, which is a light-shielded state, at the time of the measurement of a threshold voltage, whereas the liquid crystal panel 50a ensures that the photo-sensor unit 10 and the threshold voltage detection unit 20 are exposed to light, which is a lighttransmissive state, at the time of the detection of incident light amount. Accordingly, the light-shielding-unit driving unit 47 supplies a driving signal that corresponds to a desired state, that is, either the light-shielded state or the light-exposed state, to the liquid crystal panel 50a.

FIG. 17B is a diagram that schematically illustrates another example of the configuration of the light-shielding unit 50, which includes a light-shielding plate 51 and an actuator 52 that moves the light-shielding plate 51. The actuator 52 is made up of, for example, a ball screw and a motor without any limitation thereto. The shield-moving member of the actuator 52 moves the light-shielding plate 51 in the vertical direction of the drawing as shown by a double-headed arrow. At the time of the measurement of a threshold voltage, the actuator 52 moves the light-shielding plate 51 in the downward arrow direction shown therein so as to cover the photo-sensor unit 10 and the threshold voltage detection unit 20, which constitutes the light-shielded state. On the other hand, at the time of the detection of incident light amount, the light-shielding plate 51 is moved to its original position shown by a two-dot chain box so that the photo-sensor unit 10 and the threshold voltage detection unit 20 are in the light-exposed state. Accordingly, the light-shielding-unit driving unit 47 supplies a driving signal that corresponds to a desired state, that is, either the light-shielded state or the light-exposed state, to the actuator 52.

As explained above, the light-shielding-unit driving unit 47 is an electric circuit that outputs a driving signal that is required for driving the light-shielding unit 50 depending on the configuration of the light-shielding unit 50 of the optical detection device 100a. The light-shielding-unit driver 47 outputs such a driving signal upon receiving a signal from the threshold voltage measurement unit 42.

Next, the processing of detecting the amount of irradiating light performed by the optical detection device 100a according to the first variation example is explained below while referring to FIG. 18. The processing of detecting the amount of irradiating light, which is herein referred to as irradiating light amount detection processing according to the first variation example, includes the light shielding of the threshold value detection transistor 21 (step S5a) and the releasing of the light-shielded state of the threshold value detection transistor 21 (step S5b) before and after the measurement of the threshold voltage Vth (step S5) in addition to the operation steps performed by the optical detection device 100 according to the foregoing exemplary embodiment of the invention, which is illustrated in the flowchart of FIG. 2. The processing steps of the irradiating light amount detection processing according to the first variation example except for the light shielding step S5a and the shield releasing step S5b are the same as those performed by the optical detection device 100 according to the foregoing exemplary embodiment of the invention. In the following description of the irradiating light amount detection processing according to the first variation example as well as the illustration of the accompanying drawings, the same reference numerals are consistently used for the same operation steps as those performed by the optical detection device 100 according to the foregoing exemplary embodiment of the invention. Accordingly, an explanation is given below of the light shielding step S5a and the shield releasing step S5b whereas any redundant explanation is omitted.

In the threshold voltage measurement processing according to the first variation example, the light shielding processing of the threshold value detection transistor 21 is performed after the step S4 by driving the light-shielding unit 50 (step S5a). Specifically, the light-shielding-unit driving unit 47 outputs a driving signal to the light-shielding unit 50, for example, the liquid crystal panel 50a, so that the threshold value detection transistor 21 is shielded from light. Then, the threshold voltage Vth is measured in the step S5. After the measurement thereof, the light-shielding-unit driving unit 47 drives the light-shielding unit 50 so as to release the light-shielded state of the threshold value detection transistor 21 (step S5b). Specifically, the light-shielding-unit driving unit 47 outputs a driving signal to the light-shielding unit 50 so that the light-shielding unit 50 is returned to its original state, position, or the like. By this means, the threshold value detection transistor 21 is put back into the light-exposed state. With such an optical state switchover, it is possible to correctly detect a threshold voltage that represents the degree of optical degradation by driving the threshold value detection transistor 21 under the light-shielded condition in which the threshold value detection transistor 21 is not exposed to light at all.

In the configuration and operation of the optical detection device 100a according to the first variation example of an exemplary embodiment of the invention, the light-shielding unit 50 concurrently shields light propagating toward the threshold value detection transistor 21 and light propagating toward the photo detection transistor 11. Since the threshold value detection transistor 21 and the photo detection transistor 11 are concurrently shielded from light, it is possible to make the degree of the optical degradation of the former equal to the degree of the optical degradation of the latter. Notwithstanding the foregoing, however, if the measurement of a threshold voltage is performed in a short period of time so that a difference between the degree of the optical degradation of the threshold value detection transistor 21 and the degree of the optical degradation of the photo detection transistor 11 is small, or there is not any substantial difference therebetween, it is not necessary to shield light propagating toward the photo detection transistor 11 concurrently with the shielding of light propagating toward the threshold value detection transistor 21. With such a modification, it is possible to reduce the size of the light-shielding unit 50 such as the liquid crystal panel 50a and simplify the configuration thereof.

Second Variation Example

Figure 19:
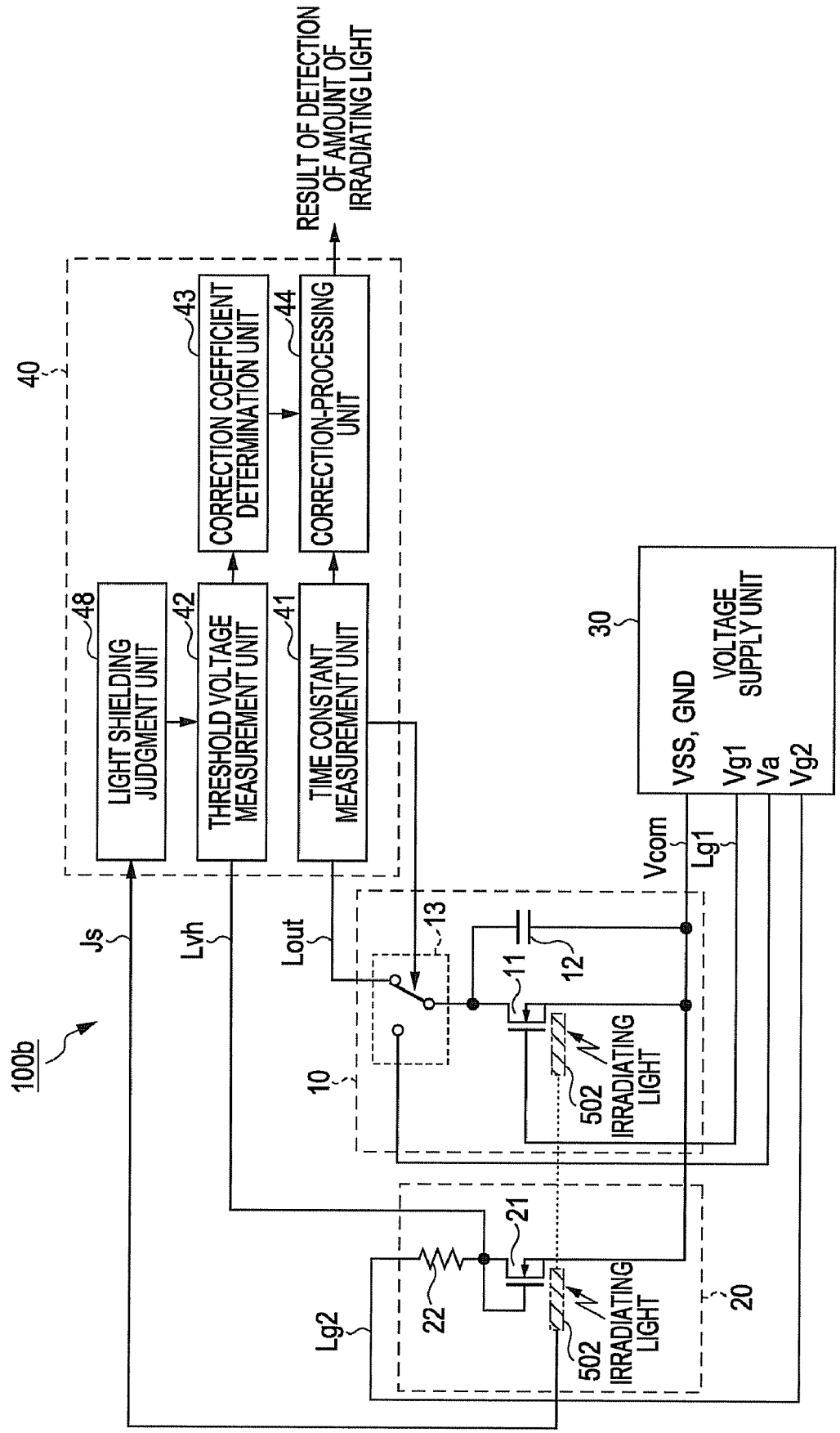
FIG. 19 is a diagram that schematically illustrates an example of the configuration of an optical detection device according to a second variation example of an exemplary embodiment of the invention.
Figure 20:
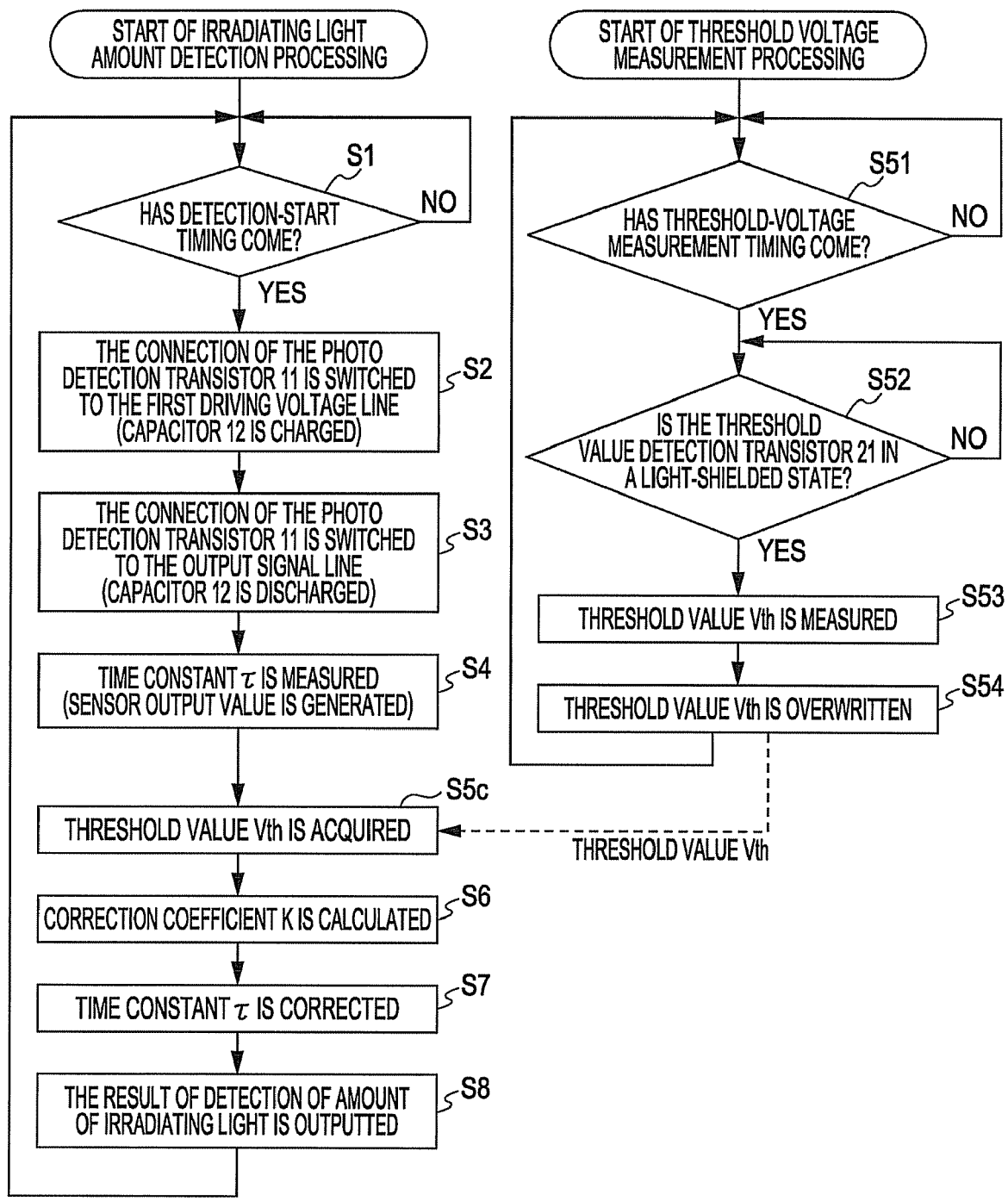
FIG. 20 is a flowchart that schematically illustrates an example of the operation flow of an optical detection device according to the second variation example of an exemplary embodiment of the invention.

As another variation example, a substitute unit, structure, and/or the like may be provided on an electronic apparatus that is provided with an optical detection device so as to ensure that the threshold value detection transistor 21 is shielded from light without providing a light-shielding unit on the optical detection device. With reference to FIGS. 19 and 20, the configuration of an optical detection device according to a second variation example of an exemplary embodiment of the invention as well as the detection of irradiating light amount and the measurement of a threshold voltage according thereto are explained below. FIG. 19 is a diagram that schematically illustrates an example of the configuration of an optical detection device 100b according to the second variation example of an exemplary embodiment of the invention. FIG. 20 is a flowchart that schematically illustrates an example of the operation flow of the optical detection device 100b according to the second variation example of an exemplary embodiment of the invention.

As illustrated in FIG. 19, the optical detection device 100b is provided with a light-shielding judgment unit 48 in addition to the components of the optical detection device 100 according to the foregoing exemplary embodiment of the invention. The light-shielding judgment unit 48 is provided in the signal-processing unit 40. The components of the optical detection device 100b according to the second variation example except for the light-shielding judgment unit 48 are the same as those of the optical detection device 100 according to the foregoing exemplary embodiment of the invention. In the following description of the optical detection device 100*b* according to the second variation example as well as the illustration of the accompanying drawings, the same reference numerals are consistently used for the same components as those of the optical detection device 100 according to the foregoing exemplary embodiment of the invention. Accordingly, the configuration of the light-shielding judgment unit 48 and the operation thereof are explained herein. Any redundant explanation is omitted.

The light-shielding judgment unit 48 makes a judgment as to whether the threshold value detection transistor 21 is in a light-shielded state or not. Then, the light-shielding judgment unit 48 outputs, to the threshold voltage measurement unit 42, a signal that indicates that the threshold value detection transistor 21 is in the light-shielded state. Upon receiving the signal that indicates that the threshold value detection transistor 21 is in the light-shielded state from the light-shielding judgment unit 48, the threshold voltage measurement unit 42 measures a voltage outputted at the drain terminal of the threshold value detection transistor 21 as the threshold voltage Vth. Thereafter, the threshold voltage measurement unit 42 outputs the result of measurement, that is, the threshold voltage Vth, to the correction coefficient determination unit 43.

The optical detection device 100*b* according to the second variation example is mounted as a component of the mobile phone terminal 500 shown in FIG. 14, which is the same as the optical detection device 100 according to the foregoing exemplary embodiment of the invention. The mobile phone terminal 500 is made up of the first body part 501 and the second body part 502 that are hinge-jointed to each other in a collapsible manner. The liquid crystal display device 1000 having the optical detection device 100*b* according to the second variation example is provided on the first body part 501 of the mobile phone terminal 500 as a display unit. When the mobile phone terminal 500 is folded so that the first body part 501 thereof and the second body part 502 thereof face each other, the threshold value detection transistor 21 (as well as the photo detection transistor 11) of the optical detection device 100*b* of the liquid crystal display device 1000 is shielded from light by the second body part 502 of the mobile phone terminal 500 as shown in FIG. 19.

The light-shielding judgment unit 48 receives a signal that indicates that the mobile phone terminal 500 has been folded so that the first body part 501 thereof and the second body part 502 thereof now face each other as a judgment signal Js. The judgment signal Js, which is generated inside the mobile phone terminal 500, indicates whether the threshold value detection transistor 21 is in the light-shielded state or not. That is, in the second variation example described herein, a signal that indicates that the mobile phone terminal 500 has been folded so that the first body part 501 thereof and the second body part 502 thereof now face each other is generated in the mobile phone terminal 500. For example, the mobile phone terminal 500 is configured so that, when it is folded so that the first body part 501 thereof and the second body part 502 thereof face each other, a projection that is formed on the first body part 501 thereof is brought into contact with a switch that is formed on/in the second body part 502 thereof and thus turns the switch ON (or OFF). As the switch is turned ON, the voltage level of the signal generated therein changes. This voltage-changing signal is used as the judgment signal Js. In most cases, some kind of a signal that indicates that the mobile phone terminal 500 has been folded so that the first body part 501 thereof and the second body part 502 thereof now face each other is generated in the mobile phone terminal 500, which is made up of the first body part 501 and the second body part 502. The light-shielding judgment unit 48 receives such an indication signal and recognizes it as the judgment signal Js, which indicates whether the threshold value detection transistor 21 is in the light-shielded state or not.

An example of the operation of the optical detection device 100*b* according to the second variation example is shown in the flowchart of FIG. 20. In the operation of the optical detection device 100*b* according to the second variation example, as has already been explained earlier, the measurement of the threshold voltage Vth is performed as a series of operation steps separated from the irradiating light amount detection processing.

The irradiating light amount detection processing according to the second variation example differs from the operation steps performed by the optical detection device 100 according to the foregoing exemplary embodiment of the invention, which is illustrated in the flowchart of FIG. 2, in that the measurement of the threshold voltage Vth (step S5) is replaced by the acquisition of the threshold voltage Vth (step S5*c*). Moreover, in the operation of the optical detection device 100*b* according to the second variation example, steps S51, S52, S53, and S54 are added as the processes of threshold voltage measurement processing, which is performed separately from the irradiating light amount detection processing. The processing steps of the irradiating light amount detection processing according to the second variation example except for the threshold voltage acquisition step S5*c* are the same as those performed by the optical detection device 100 according to the foregoing exemplary embodiment of the invention. In the following description of the irradiating light amount detection processing according to the second variation example as well as the illustration of the accompanying drawings, the same reference numerals are consistently used for the same operation steps as those performed by the optical detection device 100 according to the foregoing exemplary embodiment of the invention. Accordingly, an explanation is given below of the threshold voltage acquisition step S5*c* of the irradiating light amount detection processing and the steps S51-S54 of the separate threshold voltage measurement processing whereas any redundant explanation is omitted.

First, the threshold voltage measurement processing is explained below. As a first step of the threshold voltage measurement processing according to the second variation example, it is judged whether it has reached the point in time for starting the measurement of a threshold voltage or not (step S51). Herein, as done in the operation of the optical detection device 100 according to the foregoing exemplary embodiment of the invention, the time constant measurement unit 41 of the signal-processing unit 40 monitors its internal timer so as to judge whether it has reached the point in time for starting the measurement of a threshold voltage or not. Notwithstanding the above, the light-shielding judgment unit 48 may monitor the internal timer so as to judge whether it has reached the point in time for starting the measurement of a threshold voltage or not in place of the time constant measurement unit 41. The timing of the threshold voltage measurement will be explained later.

If it is judged in this first step that the measurement-start timing for starting the measurement of a threshold voltage has come (S51: YES), the light-shielding judgment unit 48 makes a judgment as to whether the threshold value detection transistor 21 is in the light-shielded state or not in the next step S52. As explained above, the light-shielding judgment unit 48 makes such a judgment on the basis of a received signal that indicates that the mobile phone terminal 500 has been folded so that the first body part 501 thereof and the second body part 502 thereof now face each other, which is generated in the mobile phone terminal 500.

If it is judged that the threshold value detection transistor 21 is in the light-shielded state (S52: YES), the measurement of the threshold voltage Vth is performed in the next step S53. Since the processing of the step S53 is the same as that of the step S5 according to the foregoing exemplary embodiment of the invention, an explanation thereof is omitted here. Consequently, in the measurement of the threshold voltage Vth that is performed in the step S53, a correct threshold voltage relative to the cumulative intensity of illumination is obtained as a measurement value because the threshold voltage Vth is measured under a light-shielded state in which the threshold value detection transistor 21 is shielded from light.

Next, in a step S54, the overwriting of the threshold voltage Vth is performed. In the configuration of the optical detection device 100b according to the second variation example, the threshold voltage measurement unit 42 is provided with a memory that is not illustrated in FIG. 19. The threshold voltage measurement unit 42 overwrites the measured threshold voltage Vth into the memory. Thereafter, the process returns to the step S51. Then, the processing for a judgment as to the arrival of the next threshold voltage measurement timing and subsequent processing is repeated. In this way, the updated threshold voltage Vth is always stored in the memory as the latest value.

Unlike the operation of the optical detection device 100 according to the foregoing exemplary embodiment of the invention, the acquisition of the stored threshold voltage Vth is performed in the step S5c of the irradiating light amount detection processing according to the second variation example. That is, in the irradiating light amount detection processing according to the second variation example, the correction coefficient determination unit 43 reads the threshold voltage Vth that has been stored in the memory of the threshold voltage measurement unit 42 out of the memory, which is acquired as a readout measurement value. Thereafter, a series of remaining steps from the calculation of the correction coefficient K through the outputting of the result of the detection of irradiating light amount is performed.

Therefore, in this variation example, the measurement of the threshold voltage Vth is performed when the mobile phone terminal 500 is folded so that the first body part 501 thereof and the second body part 502 thereof face each other, which occurs after the use of the mobile phone terminal 500, for example, after the completion of a telephone communication. For this reason, it is preferable to set, as the next threshold voltage measurement timing, time at which it is expected to reach the cumulative intensity of illumination that causes a certain degree of optical degradation that is large enough for the next correction of the time constant τ to be conducted.

As has been explained in the foregoing exemplary embodiment of the invention, since a change in the electrical characteristics of the threshold value detection transistor 21 due to optical degradation should be substantially the same as a change in the electrical characteristics of the photo detection transistor 11 due to optical degradation, it is necessary to ensure that the light-exposure state of the threshold value detection transistor 21 is the same as the light-exposure state of the photo detection transistor 11. In this respect, since the threshold value detection transistor 21 and the photo detection transistor 11 are concurrently shielded from light at the time of the measurement of a threshold value in this variation example, it is possible to make the degree of the optical degradation of the former equal to the degree of the optical degradation of the latter. Moreover, according to the second variation example described herein, unlike the foregoing first variation example, it is not necessary to provide a light-shielding unit in an optical detection device. Therefore, it is possible to avoid the size of the optical detection device and the production cost thereof from increasing.

Other Variation Examples

Although the mobile phone terminal 500 is taken as an example of various kinds of electronic apparatuses according to an exemplary embodiment of the invention, the scope of the invention is not limited to such a specific example. The invention can be applied to various kinds of handheld/portable devices such as a personal digital assistant (PDA), a notebook computer, a watch, and the like. In addition, the invention can be applied to various kinds of other electronic apparatuses having a display function. For example, the invention can be applied to a facsimile apparatus having a display function, the finder of a digital camera, a portable TV, an electronic personal organizer, an electrical bulletin board, a display for advertisement, without any limitation thereto.

For example, if the electronic apparatus is embodied as a digital camera that has a lens cover that can be closed to cover a photographing lens when the camera is not used for photographing and can be opened to expose the photographing lens when the camera is used for photographing, the light-shielding unit can be configured as a member that moves together with the lens cover in such a variation example. With such a configuration, it is possible to easily shield light by closing the lens cover. In addition, it is possible to judge a light-shielded state easily.

The entire disclosure of Japanese Patent Application No. 2008-089910, filed Mar. 31, 2008 and 2008-211462, Aug. 20, 2008 are expressly incorporated by reference herein.

What is claimed is:

1. An optical detection device comprising:
   an optical sensing section that has an optical detection transistor and outputs a signal corresponding to the amount of light irradiated to the optical detection transistor;
   a threshold voltage detecting section that has a threshold value detection transistor that is provided adjacent to the optical detection transistor and is formed in the same process as the formation process of the optical detection transistor, the threshold voltage detecting section detecting the threshold voltage of the threshold value detection transistor;
   a sensor output value generating section that generates a sensor output value that relates to the amount of irradiating light on the basis of the signal outputted from the optical sensing section;
   a correction coefficient determining section that determines a correction coefficient that is used for correcting a change in the sensor output value that is caused by the optical degradation of the optical detection transistor and corresponds to the threshold voltage detected at the threshold voltage detecting section on the basis of a relationship between the correction coefficient and the threshold voltage, the relationship between the correction coefficient and the threshold voltage being predetermined on the basis of a correlation between a change in a sensor output value relative to the degree of the optical degradation of the optical detection transistor and a change in the threshold voltage relative to the degree of the optical degradation of the optical detection transistor; and a correction processing section that corrects the sensor output value on the basis of the correction coefficient that has been determined at the correction coefficient determining section.

2. The optical detection device according to claim 1, wherein the correction coefficient determining section calculates the correction coefficient that corresponds to the threshold voltage detected at the threshold voltage detecting section on the basis of an arithmetic expression that represents the relationship between the correction coefficient and the threshold voltage.

3. The optical detection device according to claim 1, wherein the correction coefficient determining section stores a lookup table that represents the relationship between the correction coefficient and the threshold voltage, and acquires the correction coefficient that corresponds to the threshold voltage detected at the threshold voltage detecting section from the lookup table.

4. The optical detection device according to claim 1, comprising:

the optical sensing section that has
the optical detection transistor that is an N channel metal oxide semiconductor transistor whose source terminal is connected to a reference potential line and gate terminal is connected to a gate voltage line, the metal oxide semiconductor transistor being hereafter referred to as MOS transistor,
a capacitor whose one electrode is connected to the drain terminal of the optical detection transistor and the other electrode is connected to the reference potential line, and
a switch that switches the connection of the drain terminal of the optical detection transistor between a first driving voltage line and an output signal line;

the threshold voltage detecting section that has
the threshold value detection transistor that is an N channel MOS transistor whose drain terminal and gate terminal are connected to each other whereas the source terminal thereof is connected to the reference potential line and
a resistance element whose one terminal is connected to the drain terminal of the threshold value detection transistor and the other terminal thereof is connected to a second driving voltage line, the resistance element having a resistance value that is set higher than the ON resistance of the threshold value detection transistor and lower than the OFF resistance of the threshold value detection transistor; and a voltage supplying section that supplies a first driving voltage for charging the capacitor to the first driving voltage line, a gate voltage for setting the optical detection transistor into an OFF state to the gate voltage line, a second driving voltage that is higher than the maximum threshold voltage of the threshold value detection transistor to the second driving voltage line, and a reference potential to the reference potential line, wherein the sensor output value generating section controls the switch at the time when the detection of the amount of irradiating light is started so that the drain terminal of the optical detection transistor is connected to the first driving voltage line, and after the lapse of a predetermined length of time through which the capacitor becomes charged completely, the sensor output value generating section controls the switch so that the connection of the drain terminal of the optical detection transistor is switched from the first driving voltage line to the output signal line, and then measures a time constant till the electric potential of the output signal line drops to a predetermined electric potential as the sensor output value;

the correction coefficient determining section acquires the voltage of the drain terminal of the threshold value detection transistor as the threshold voltage and determines the correction coefficient that corresponds to the acquired threshold voltage; and the correction processing section corrects the time constant as the sensor output value on the basis of the correction coefficient determined at the correction coefficient determining section.

5. The optical detection device according to claim 4, wherein the voltage supplying section supplies the gate voltage for setting the optical detection transistor in the OFF state to the gate voltage line and the second driving voltage that is higher than the maximum threshold voltage of the threshold value detection transistor to the second driving voltage line at least during a time period from the start of the detection of the amount of irradiating light till the completion of the measurement of the time constant and the threshold voltage whereas the gate voltage and the second driving voltage are changed during other time period.

6. The optical detection device according to claim 1, wherein each of the optical detection transistor and the threshold value detection transistor is an amorphous silicon thin film transistor.

7. An electro-optical device comprising:
a substrate on which a plurality of pixels, a plurality of scanning lines, and a plurality of data lines are formed in a display area, each of the plurality of pixels having a switching transistor;
a counter substrate that is provided opposite to the substrate;
an electro-optical material that is sandwiched between the substrate and the counter substrate; and
the optical detection device according to claim 1,
wherein at least the optical sensing section and the threshold voltage detecting section are provided in an area other than the display area over the substrate; and
the optical detection transistor and the threshold value detection transistor are formed in the same process as the formation process of the switching transistor over the substrate.

8. The electro-optical device according to claim 7, comprising:
liquid crystal as the electro-optical material;
a backlight; and
a backlight controller that controls the amount of the backlight on the basis of the sensor output value that has been corrected at the correction processing section of the optical detection device.

9. An electronic apparatus that is provided with the electro-optical device according to claim 7 as a display device.

10. The optical detection device according to claim 1, further comprising a light-shielding judging section that makes a judgment as to whether the threshold value detection transistor is in a light-shielded state in which the threshold value detection transistor is not exposed to light or not, wherein the threshold voltage detecting section detects the threshold voltage of the threshold value detection transistor in the light-shielded state judged by the light-shielding judging section.

11. An electro-optical device comprising:
a substrate on which a plurality of pixels, a plurality of scanning lines, and a plurality of data lines are formed in a display area, each of the plurality of pixels having a switching transistor;
a counter substrate that is provided opposite to the substrate;
an electro-optical material that is sandwiched between the substrate and the counter substrate; and
the optical detection device according to claim 10,
wherein at least the optical sensing section and the threshold voltage detecting section are provided in an area other than the display area over the substrate; and
the optical detection transistor and the threshold value detection transistor are formed in the same process as the formation process of the switching transistor over the substrate.

12. The electro-optical device according to claim 11, comprising:
liquid crystal as the electro-optical material;
a backlight; and
a backlight controller that controls the amount of the backlight on the basis of the sensor output value that has been corrected at the correction processing section of the optical detection device.

13. An electronic apparatus comprising:
a light-shielding unit that puts the threshold value detection transistor into a light-shielded state in which the threshold value detection transistor is not exposed to light; and
the electro-optical device according to claim 11 as a display device.

14. The electronic apparatus according to claim 13, wherein the light-shielding unit puts the optical detection transistor into a light-shielded state in which the optical detection transistor is not exposed to light in addition to putting the threshold value detection transistor into a light-shielded state in which the threshold value detection transistor is not exposed to light.

15. The electronic apparatus according to claim 13 that is a cellular telephone that has a body part that covers the display unit when the electronic apparatus is not in use and exposes the display unit when the electronic apparatus is in use, wherein the light-shielding unit is provided as the body part.

16. The optical detection device according to claim 1, further comprising a light-shielding unit, wherein the threshold voltage of the threshold value detection transistor is detected with the threshold value detection transistor being put into a light-shielded state in which the threshold value detection transistor is not exposed to light by means of the light-shielding unit.

17. The optical detection device according to claim 16, wherein the light-shielding unit puts the optical detection transistor into a light-shielded state in which the optical detection transistor is not exposed to light in addition to putting the threshold value detection transistor into a light-shielded state in which the threshold value detection transistor is not exposed to light.

18. An electro-optical device comprising:
a substrate on which a plurality of pixels, a plurality of scanning lines, and a plurality of data lines are formed in a display area, each of the plurality of pixels having a switching transistor;
a counter substrate that is provided opposite to the substrate;
an electro-optical material that is sandwiched between the substrate and the counter substrate; and
the optical detection device according to claim 16,
wherein at least the optical sensing section and the threshold voltage detecting section are provided in an area other than the display area over the substrate; and
the optical detection transistor and the threshold value detection transistor are formed in the same process as the formation process of the switching transistor over the substrate.

19. The electro-optical device according to claim 18, comprising:
liquid crystal as the electro-optical material;
a backlight; and
a backlight controller that controls the amount of the backlight on the basis of the sensor output value that has been corrected at the correction processing section of the optical detection device.

20. An electronic apparatus that is provided with the electro-optical device according to claim 18 as a display device.

21. An optical degradation correction method comprising:
acquiring, via an optical sensing section that has an optical detection transistor, a signal corresponding to the amount of light irradiated to the optical detection transistor;
generating a sensor output value that relates to the amount of irradiating light on the basis of the signal acquired in the light amount signal acquisition;
detecting, via a threshold voltage detecting section that has a threshold value detection transistor, the threshold voltage of the threshold value detection transistor, wherein the threshold value detection transistor is provided adjacent to the optical detection transistor and is formed in the same process as the formation process of the optical detection transistor;
determining a correction coefficient that is used for correcting a change in a sensor output value that is caused by the optical degradation of the optical detection transistor and corresponds to the threshold voltage detected in the threshold voltage detection on the basis of a relationship between the correction coefficient and the threshold voltage, the relationship between the correction coefficient and the threshold voltage being predetermined on the basis of a correlation between a change in the sensor output value relative to the degree of the optical degradation of the optical detection transistor and a change in the threshold voltage relative to the degree of the optical degradation of the optical detection transistor; and
correcting the sensor output value generated in the sensor output value generation on the basis of the correction coefficient that has been determined in the correction coefficient determination.

22. The optical degradation correction method according to claim 21, wherein, in the threshold voltage detection, the threshold voltage of the threshold value detection transistor is detected in a light-shielded state in which the threshold value detection transistor is not exposed to light.

* * * * *